(12) United States Patent
Brookes

(10) Patent No.: US 10,322,789 B2
(45) Date of Patent: *Jun. 18, 2019

(54) FILLING APPARATUS FOR HIGH-ALTITUDE BALLOONS

(71) Applicant: LOON LLC, Mountain View, CA (US)

(72) Inventor: Kyle Brookes, Redwood City, CA (US)

(73) Assignee: Loon LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/797,273

(22) Filed: Oct. 30, 2017

(65) Prior Publication Data

US 2018/0118321 A1 May 3, 2018

Related U.S. Application Data

(63) Continuation of application No. 15/161,613, filed on May 23, 2016, now Pat. No. 9,821,900, which is a continuation of application No. 14/703,061, filed on May 4, 2015, now Pat. No. 9,371,124, which is a continuation of application No. 14/249,841, filed on Apr. 10, 2014, now Pat. No. 9,027,877.

(51) Int. Cl.
*B64B 1/58* (2006.01)
*B64B 1/40* (2006.01)
*B64F 5/00* (2017.01)

(52) U.S. Cl.
CPC .............. *B64B 1/58* (2013.01); *B64B 1/40* (2013.01); *B64F 5/00* (2013.01); *Y10T 137/3584* (2015.04)

(58) Field of Classification Search
CPC ...... B64B 1/40; B64B 1/58; B64F 5/00; Y10T 137/3584; Y10T 137/3724
See application file for complete search history.

(56) References Cited

U.S. PATENT DOCUMENTS 1,331,194 A * 2/1920 Griffin ................... F16K 15/20
  137/234
2,207,212 A * 7/1940 Arey ......................... B60C 5/20
  137/223

(Continued)

FOREIGN PATENT DOCUMENTS

CN   2084140 U   9/1991
CN   201050614 Y   4/2008
(Continued)

OTHER PUBLICATIONS

"Using the Pinch-Off Tool", 2009.
(Continued)

*Primary Examiner* — Medhat Badawi
(74) *Attorney, Agent, or Firm* — Botos Churchill IP Law

(57) ABSTRACT

High-altitude balloons and apparatuses for filling such high-altitude balloons are provided. As an example, an apparatus for filling a high-altitude balloon includes a tube extending through envelope material of the balloon is provided. The apparatus also includes a flange connected to a first end of the tube. The flange is connected to an interior surface of the balloon. A fitting is connected to a second end of the tube. The fitting is configured for attachment with an apparatus for filling the balloon with lift gas. In addition, methods of filling high-altitude balloons with lift gas and methods of manufacturing balloons are also provided.

20 Claims, 20 Drawing Sheets

(56) References Cited

U.S. PATENT DOCUMENTS

| | | | | |
|---|---|---|---|---|
| 2,392,199 A * | 1/1946 | Steiger | H01Q 1/081 | 116/210 |
| 2,649,804 A * | 8/1953 | Kennedy | A63H 27/10 | 446/187 |
| 2,666,601 A * | 1/1954 | Huch | B64B 1/40 | 244/31 |
| 2,779,554 A * | 1/1957 | Kizzek | B64B 1/40 | 24/30.5 L |
| 2,919,082 A * | 12/1959 | Winzen | B64B 1/58 | 24/462 |
| 2,954,187 A * | 9/1960 | Winzen | B64B 1/40 | 244/31 |
| 3,002,490 A * | 10/1961 | Murray | G08B 5/002 | 116/210 |
| 3,289,026 A * | 11/1966 | Elton | H05H 1/36 | 250/281 |
| 3,332,390 A * | 7/1967 | Ashline | B64B 1/62 | 116/210 |
| 3,495,594 A * | 2/1970 | Swanson | A61M 25/1018 | 137/223 |
| 3,856,186 A * | 12/1974 | Hay | B60R 21/08 | 137/802 |
| 3,871,422 A * | 3/1975 | Elson | F16K 15/20 | 137/231 |
| 3,929,091 A * | 12/1975 | Holder | B64B 1/62 | 116/210 |
| 4,238,095 A * | 12/1980 | Slater | B64B 1/66 | 244/115 |
| 4,428,149 A * | 1/1984 | Brown | A63H 27/10 | 446/222 |
| 4,434,958 A * | 3/1984 | Rougeron | E04H 7/14 | 244/126 |
| 4,529,018 A * | 7/1985 | Lichfield | B64B 1/64 | 141/4 |
| 4,542,445 A * | 9/1985 | Marletta | F21L 2/00 | 362/206 |
| 4,715,841 A * | 12/1987 | Nelson | A63H 27/10 | 24/545 |
| 4,717,092 A * | 1/1988 | Cameron | A63H 27/085 | 116/210 |
| 4,798,554 A * | 1/1989 | Nelson | A63H 27/10 | 446/220 |
| 4,836,128 A * | 6/1989 | Walker | B64B 1/50 | 116/210 |
| 5,033,256 A * | 7/1991 | Rupp | A63H 27/10 | 53/262 |
| 5,104,059 A * | 4/1992 | Rand | B64B 1/42 | 244/126 |
| 5,279,340 A * | 1/1994 | Scherr | A63H 27/10 | 141/114 |
| 5,301,631 A * | 4/1994 | Vining | B64B 1/50 | 116/210 |
| 5,370,161 A * | 12/1994 | Shafer | A63H 27/10 | 141/114 |
| 5,460,300 A * | 10/1995 | Tritsch | B05B 9/0822 | 222/401 |
| 5,496,203 A * | 3/1996 | Murray | A63H 27/10 | 446/221 |
| 5,499,941 A * | 3/1996 | Penjuke, Sr. | A63H 27/10 | 137/560 |
| 5,588,896 A * | 12/1996 | Goodman | A63H 27/10 | 124/57 |
| 5,776,291 A * | 7/1998 | Lang | A63H 27/10 | 156/290 |
| 5,873,764 A * | 2/1999 | Scherr | A63H 3/06 | 141/114 |
| 6,321,951 B1 * | 11/2001 | Frutin | B65D 83/201 | 222/389 |
| 6,375,534 B1 * | 4/2002 | Burns | A63H 27/10 | 40/212 |
| 6,430,804 B1 * | 8/2002 | Nelson | A63H 27/10 | 29/235 |
| 6,488,557 B1 * | 12/2002 | Elliott | A63H 27/10 | 446/220 |
| 6,892,772 B1 * | 5/2005 | Wang | A63H 27/10 | 141/114 |
| 7,147,536 B1 * | 12/2006 | Hartelius | A63H 27/10 | 446/220 |
| 7,344,267 B2 | 3/2008 | Carito | | |
| 7,356,390 B2 * | 4/2008 | Knoblach | B64B 1/40 | 701/4 |
| 7,380,575 B2 * | 6/2008 | Stricklin | B65B 3/045 | 141/10 |
| 7,686,668 B1 * | 3/2010 | Butler | A63H 27/10 | 239/1 |
| 7,708,222 B2 * | 5/2010 | Lee | B64B 1/50 | 244/115 |
| 7,934,522 B2 * | 5/2011 | Liao | B65D 81/052 | 141/10 |
| 8,167,859 B2 * | 5/2012 | Shah | A61F 5/445 | 604/339 |
| 8,186,392 B2 * | 5/2012 | Gustafsson | B65B 39/08 | 141/10 |
| 8,196,620 B2 * | 6/2012 | Fransen | B65D 83/62 | 141/10 |
| 8,707,661 B2 * | 4/2014 | Kinoshita | B29C 65/02 | 53/451 |
| 8,777,050 B1 * | 7/2014 | Joshi | B65D 88/16 | 220/666 |
| 8,814,084 B2 * | 8/2014 | Shenhar | A63H 27/10 | 244/97 |
| 8,936,568 B2 * | 1/2015 | Webler | A61B 17/12022 | 604/103.06 |
| 8,950,107 B1 * | 2/2015 | Rosenbloom | A01K 91/03 | 43/44.87 |
| 9,027,877 B1 * | 5/2015 | Brookes | B64B 1/58 | 244/98 |
| 9,067,666 B1 * | 6/2015 | Roach | B64B 1/42 | |
| 9,221,531 B1 * | 12/2015 | Brookes | B64B 1/62 | |
| 9,266,599 B1 * | 2/2016 | Ratner | B64B 1/62 | |
| 9,346,532 B1 * | 5/2016 | Ratner | B64B 1/58 | |
| 9,573,671 B1 * | 2/2017 | Roach | B64B 1/62 | |
| 9,643,707 B1 | 5/2017 | Ratner | | |
| 9,643,708 B2 | 5/2017 | Ratner | | |
| 9,963,216 B1 * | 5/2018 | Fourie | B64B 1/58 | |
| 10,035,576 B1 * | 7/2018 | Brookes | B64B 1/40 | |
| 10,059,420 B1 * | 8/2018 | Hall-Snyder | B64B 1/46 | |
| 10,071,850 B2 * | 9/2018 | Sugawara | B65D 83/38 | |
| 2003/0032507 A1 * | 2/2003 | Lacroix | A63B 41/00 | 473/593 |
| 2004/0003517 A1 * | 1/2004 | Marvin | A43B 13/20 | 36/93 |
| 2004/0036046 A1 * | 2/2004 | Hull | F16K 1/306 | 251/121 |
| 2004/0045651 A1 * | 3/2004 | Haunhorst | B60C 23/003 | 152/415 |
| 2004/0126279 A1 * | 7/2004 | Renzi | B01L 3/502715 | 422/502 |
| 2004/0198150 A1 * | 10/2004 | Nelson | A63H 27/10 | 446/224 |
| 2005/0014134 A1 * | 1/2005 | West | G01N 27/44791 | 435/5 |
| 2005/0098227 A1 * | 5/2005 | Stanley | A63H 27/10 | 141/114 |
| 2005/0123425 A1 * | 6/2005 | Smith, III | F04B 15/08 | 417/424.1 |
| 2005/0127091 A1 * | 6/2005 | Smith, III | F04D 7/02 | 222/1 |
| 2005/0207168 A1 * | 9/2005 | Chabert | F21S 6/004 | 362/373 |
| 2006/0057930 A1 * | 3/2006 | Rozenberg | A63H 27/10 | 446/220 |
| 2006/0104070 A1 * | 5/2006 | Carito | A63H 27/10 | 362/398 |
| 2007/0095424 A1 * | 5/2007 | Powell | A61J 1/20 | 141/114 |
| 2007/0235083 A1 * | 10/2007 | Dlugos | A61F 5/0003 | 137/223 |

(56) References Cited

U.S. PATENT DOCUMENTS

| | | | | |
|---|---|---|---|---|
| 2007/0235553 A1* | 10/2007 | Crowe | | A61L 9/04 239/60 |
| 2007/0297174 A1* | 12/2007 | Girolami | | F21V 3/026 362/253 |
| 2008/0153382 A1* | 6/2008 | Borg | | A63H 17/00 446/220 |
| 2008/0262450 A1* | 10/2008 | Shah | | A61F 5/445 604/339 |
| 2008/0268742 A1* | 10/2008 | Shenhar | | A63H 27/10 446/225 |
| 2009/0014072 A1* | 1/2009 | Zhang | | A47C 27/081 137/522 |
| 2009/0014644 A1* | 1/2009 | Yang | | H01J 49/145 250/288 |
| 2009/0047864 A1* | 2/2009 | Burchett | | A63H 27/10 446/224 |
| 2009/0296372 A1* | 12/2009 | Schrimmer | | A63H 27/10 362/96 |
| 2009/0303704 A1* | 12/2009 | Schrimmer | | A63H 27/10 362/184 |
| 2010/0246165 A1* | 9/2010 | Diaz | | A63H 27/10 362/183 |
| 2011/0303705 A1* | 12/2011 | Coroneos | | B65D 83/207 222/402.1 |
| 2012/0053612 A1* | 3/2012 | Birk | | A61F 5/0036 606/192 |
| 2012/0067453 A1* | 3/2012 | Ramere | | A63H 27/10 141/1 |
| 2012/0097159 A1* | 4/2012 | Iyer | | B05D 5/083 128/203.12 |
| 2012/0097293 A1* | 4/2012 | Dancescu | | A63H 27/10 141/317 |
| 2012/0129420 A1* | 5/2012 | Wu | | A63H 27/10 446/220 |
| 2012/0191123 A1* | 7/2012 | Brister | | A61F 5/0043 606/191 |
| 2012/0267004 A1* | 10/2012 | Sikorcin | | A63H 27/10 141/314 |
| 2013/0109539 A1* | 5/2013 | Chen | | A63B 5/11 482/27 |
| 2013/0112317 A1* | 5/2013 | Draier | | B65B 9/20 141/114 |
| 2013/0119188 A1* | 5/2013 | Ciampa | | B64B 1/62 244/30 |
| 2013/0146174 A1* | 6/2013 | Zinn | | B65B 3/06 141/2 |
| 2013/0167976 A1* | 7/2013 | Vervoort | | B65D 83/201 141/311 R |
| 2013/0186516 A1* | 7/2013 | Sidwell | | B65B 1/00 141/349 |
| 2014/0096867 A1* | 4/2014 | Cayton | | F21S 10/02 141/98 |
| 2014/0158823 A1* | 6/2014 | Smith | | B64B 1/44 244/1 A |
| 2014/0284436 A1* | 9/2014 | Erwin | | A47F 7/0028 248/176.1 |
| 2014/0295728 A1* | 10/2014 | Cayton | | F21S 10/02 446/220 |
| 2014/0295732 A1* | 10/2014 | Henrik | | A63H 27/10 446/485 |
| 2014/0367511 A1* | 12/2014 | Knoblach | | B64B 1/40 244/97 |
| 2015/0192212 A1* | 7/2015 | Landi, Jr. | | B29C 49/4252 137/223 |
| 2015/0266560 A1* | 9/2015 | Ratner | | B64B 1/46 244/99 |
| 2015/0283473 A1* | 10/2015 | Frazier | | A63H 27/10 141/96 |
| 2015/0291270 A1* | 10/2015 | Brookes | | B64B 1/58 244/31 |
| 2016/0018375 A1* | 1/2016 | Fahrni | | G01N 1/2226 73/37 |
| 2016/0166968 A1* | 6/2016 | Lee | | F17C 11/007 55/356 |

FOREIGN PATENT DOCUMENTS

| | | |
|---|---|---|
| CN | 101648447 A | 2/2010 |
| CN | 103063069 A | 4/2013 |
| CN | 103093848 A | 5/2013 |
| WO | 8805328 A1 | 7/1988 |

OTHER PUBLICATIONS

"Copper Pinch-Off Tubes", Huntington Mechanical Laboratories, Inc., Downloaded on Apr. 10, 2014.
International Search Report and Written Opinion for Application No. PCT/US2015/024649 dated Jul. 20, 2015.
International Preliminary Report on Patentability for PCT Application No. PCT/US2015/024649, dated Oct. 20, 2016.
The First Office Action for Chinese Patent Application No. 201580028587.X dated Apr. 20, 2018.
Extended European Search Report for European Patent Application No. 15777021.5 dated Nov. 9, 2017. 9 pages.

* cited by examiner

FILLING APPARATUS FOR HIGH-ALTITUDE BALLOONS

CROSS-REFERENCE TO RELATED APPLICATIONS

The present application is a continuation of U.S. patent application Ser. No. 15/161,613, filed May 23, 2016, which is a continuation of is a continuation of U.S. patent application Ser. No. 14/703,061, filed May 4, 2015, now issued as U.S. Pat. No. 9,371,124, which is a continuation of U.S. patent application Ser. No. 14/249,841, filed Apr. 10, 2014, now issued as U.S. Pat. No. 9,027,877, the disclosures of which are incorporated herein by reference.

BACKGROUND

Computing devices such as personal computers, laptop computers, tablet computers, cellular phones, and countless types of Internet-capable devices are increasingly prevalent in numerous aspects of modem life. As such, the demand for data connectivity via the Internet, cellular data networks, and other such networks, is growing. However, there are many areas of the world where data connectivity is still unavailable, or if available, is unreliable and/or costly. Accordingly, additional network infrastructure is desirable.

Some systems may provide network access via a balloon network operating in the stratosphere. Because of the various forces experienced by these balloons during deployment and operation, there is a balancing of needs between flexibility and stability of materials. The balloons may be made of an envelope material configured in sections or lobes to create a "pumpkin" or lobed balloon. The lobes are supported by a plurality of tendons.

Before a balloon can be deployed, its envelope must be inflated with lighter than air lift gas. Helium and hydrogen gases are two alternatives for lighter and air lift gases. Helium is an inert gas and thus considered generally safe. With helium, filling features can be sealed with O-rings, check vales, or caps in a manual setting. As an example, a person may remove a cap from a filling port, insert a filling hose, pull out the filing hose, and cap the filling port. When the filling hose is removed, gas can escape from the balloon. Even traditional one-way valves may allow a small amount of gas to leak. Purging after closing the valve, but prior to disconnecting the fill line can prevent leaks, but adds additional complexity to the design. However, with helium prices on the rise and reduced availability, hydrogen is becoming a more economical option. However, as hydrogen is highly explosive when combined with air, its use can present safety issues, especially during inflation.

BRIEF SUMMARY

Aspects of the present disclosure are advantageous for providing a leak free fill port that is also simple, robust and economical. For example, a high-altitude balloon including an apparatus for filling the high-altitude balloon is provided. The apparatus includes a tube configured to extend through envelope material of the balloon. A flange portion is connected to a first end of the tube. The flange portion is also situated on an interior surface of the balloon. A fitting is connected to a second end of the tube. The fitting is configured to attachment to an apparatus for filling the balloon with lift gas.

In one example, the tube is configured to be cold welded to seal the lift gas in the balloon. In another example, the flange portion includes a sealing O-ring configured to form a seal between the flange portion and the envelope material. In another example, high vacuum grease is applied to the sealing O-ring. In another example, the flange portion is arranged as the base of a plug having threading, and wherein the apparatus further comprises a retaining nut having threading configured to mate with the threading of the plug in order to secure the apparatus to the envelope material. In this example, the second end of the tube includes a second flange portion including at least one sealing O-ring configured to form a seal between the second flange portion and an interior of the plug. In addition, the apparatus includes a cap portion configured to secure the second flange portion to the plug.

Other aspects of the disclosure provide a method of manufacturing a high-altitude balloon having a balloon envelope. The method includes inserting a tube through an opening in material of an incomplete balloon envelope. The tube has a flange portion at a first end. The tube is secured to the incomplete balloon envelope. The incomplete balloon envelope is then completed such that the flange portion and the surface of the material are located within a chamber of the completed balloon envelope configured to receive lift gas.

In one example, the method also includes attaching a fitting to a second end of the tube, the fitting being configured to attach to a filling apparatus for filling the completed balloon envelope with the lift gas. In this example, attaching the fitting includes braze welding the fitting to the tube. In another example, the method also includes making the opening in the material. In another example, further securing the tube to the incomplete balloon envelope includes using an O-ring to clamp the balloon envelope material to the tube.

Further aspects of the disclosure provide a method of filling a high-altitude balloon with lift gas. The method includes connecting a filling apparatus to a fitting. The fitting is connected to a first end of a tube. The tube has a flange portion at a second end and is connected to an envelope of the balloon. The method also includes filling the envelope with the lift gas using the filling apparatus and pinching off the tube such that the tube is separated from the filling apparatus.

In one example, the pinching off is a cold welding process which reduces a likelihood of combustion of the lift gas. In another example, the welding prevents the lift gas from escaping from the envelope after the filling. In another example, the lift gas includes hydrogen.

Another aspect of the disclosure provides a method of manufacturing a high-altitude balloon having a balloon envelope and a filling port. The method includes placing a plug body having a flange portion and a threaded portion within an opening in material of an incomplete balloon envelope such that the flange portion is situated on a first side of the incomplete balloon envelope and at least some of the threaded portion is situated on a second side of the incomplete balloon envelope; attaching a retaining nut to the plug body to secure the plug body to the incomplete balloon envelope; completing the incomplete balloon envelope such that the flange portion and the surface of the material are located within a chamber of the completed balloon envelope configured to receive lift gas and the plug body and retaining nut are arranged as the part of the filling port.

In one example, the method also includes attaching a sealing O-ring to the plug body, the sealing O-ring being configured to form a seal between the flange portion and an interior of the plug body. In another example, the method also includes attaching a cap portion to a second flange portion at one end of a tube in order to secure the second flange portion to the plug body. In this example, the method also includes attaching a fitting to a second end of the tube, the fitting being configured to attach to a filling apparatus for filling the completed balloon envelope with the lift gas.

DETAILED DESCRIPTION

The present disclosure generally relates to filling high altitude balloons with gas. As discussed above, such balloons may need to be filled with lighter than air lift gasses such as helium or hydrogen. As helium becomes more expensive with lesser availability, hydrogen becomes a more attractive option. However, because hydrogen is flammable, it is important to have filling features which reduce the likelihood of gas escaping, which could cause serious damage or injury to persons.

In one aspect, the filling apparatus may include a pinch-off tube having a threaded body and a flange portion or plate at one end and a fitting at the other end may be utilized. Pinch-off tubes are typically used to provide hermetic and leak tight for vacuum and low pressure applications.

Where the balloon is likely to be used for more long term flights, for example weeks or months or more, even very slow leaks can reduce the effectiveness of the balloon envelope. In such examples, the pinch-off tube may be attached to a cap and balloon envelope using a plurality of seals in order to further reduce the likelihood of even such small leaks. For instance, the filling apparatus may include a pinch off tube attached to a fitting at one end as well as a plug, a fill port body, a fill port body retaining nut, and a fill tube cap. When assembled, sealing O-rings may provide an air tight seal between the filling apparatus and the balloon envelope.

As noted above, a fitting may be welded to an end of the pinch off tube, for example, using braze welding. The pinch-off tube may be positioned through a hole in the balloon envelope material. The balloon envelope material may be sealed together in a completed envelope and made ready for filling. In some examples, high vacuum grease may be applied to any O-ring seals before or after the balloon is sealed together.

To fill the balloon, the fitting may be connected to an apparatus for providing filling gas such as hydrogen or helium. Once the filling is completed, the tubing may be cold welded shut by a scissor-like cutter. By doing so, there is no chance for the lift gas to escape and little likelihood of injury due when using a gas such as hydrogen. In addition, the cold welding does not need to be performed manually by a person, but may be done automatically by another apparatus. The pinch-off tube provides a single use, simple, and non-moving part that is reliable, economical, and safe when using flammable filler gasses such as hydrogen.

Figure 1:
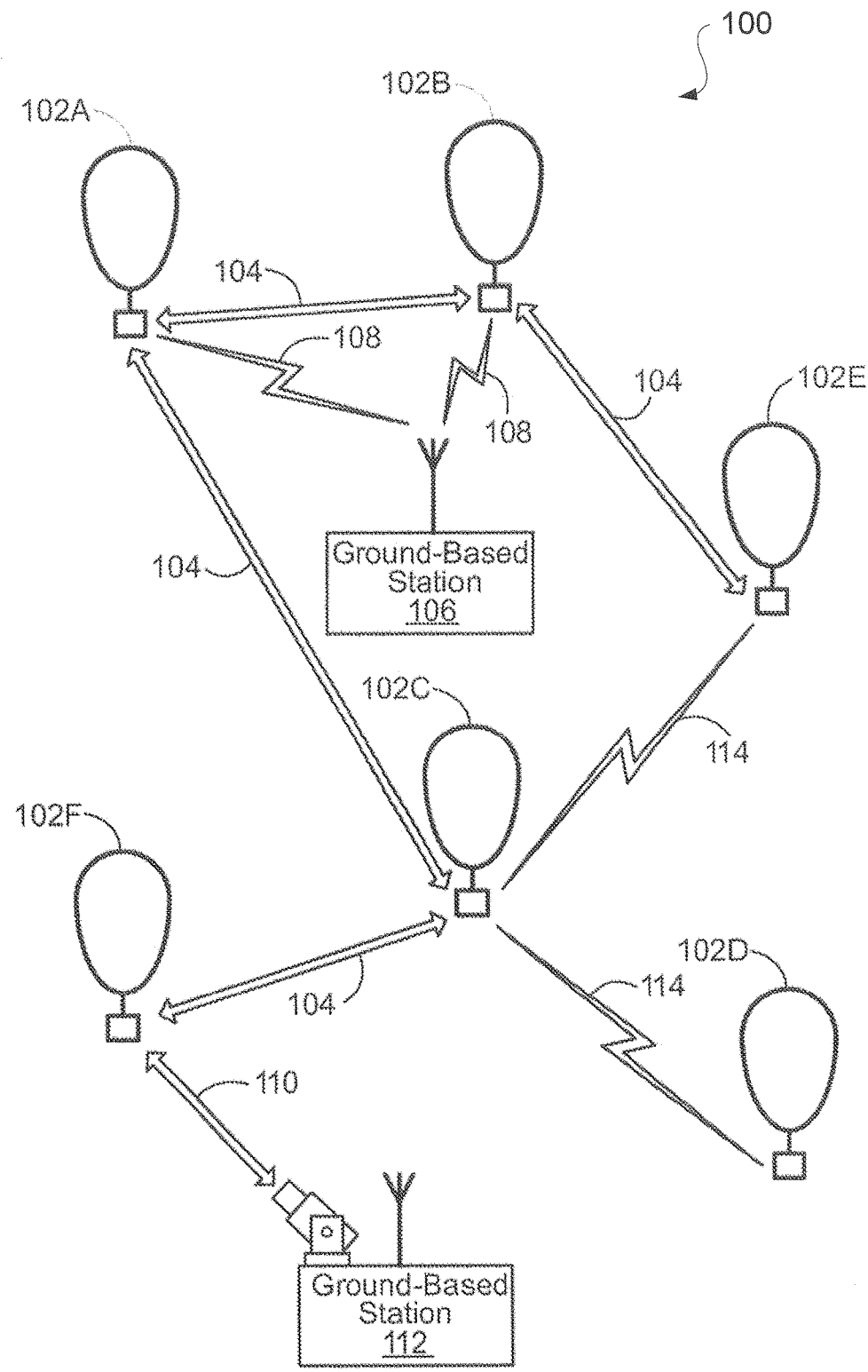
FIG. 1 is a functional diagram of a system in accordance with aspects of the disclosure.

FIG. 1 depicts an example system 100 in which a high altitude balloons as described above may be used. This example should not be considered as limiting the scope of the disclosure or usefulness of the features described herein. System 100 may be considered a "balloon network." In this example, balloon network 100 includes a plurality of devices, such as of high altitude balloons 102A-F as well as ground base stations 106 and 112. Balloon network 100 may also include a plurality of additional devices, such as various computing devices (not shown) as discussed in more detail below.

As shown, the devices of system 100 are configured to communicate with one another. As an example, the balloons may include free-space optical links 104 and/or radiofrequency (RF) links 114 in order to facilitate intra-balloon communications. In this way, balloons 102A-F may collectively function as a mesh network for packet data communications. Further, at least some of balloons 102A-B may be configured for RF communications with ground-based stations 106 and 112 via respective RF links 108. Some balloons, such as balloon 102F, could be configured to communicate via optical link 110 with ground-based station 112.

As noted above, to transmit data to another balloon, a given balloon 102 may be configured to transmit an optical signal via an optical link 104. In addition, the given balloon 102 may use one or more high-power light-emitting diodes (LEDs) to transmit an optical signal. Alternatively, some or all of the balloons may include laser systems for free-space optical communications over the optical links 104. Other types of free-space optical communication are possible.

Further, in order to receive an optical signal from another balloon via an optical link 104, a given balloon may include one or more optical receivers.

The balloons 102A-F may collectively function as a mesh network. More specifically, since balloons 102A-F may communicate with one another using free-space optical links, the balloons may collectively function as a free-space optical mesh network where each balloon may function as a node of the mesh network. As noted above, the balloons of balloon network 100 may be high-altitude balloons, which are deployed in the stratosphere. As an example, the balloons may generally be configured to operate at altitudes between 18 km and 25 km above the Earth's surface in order to limit the balloon's exposure to high winds and interference with commercial airline flights. Additional aspects of the balloons are discussed in greater detail below, with reference to FIG. 2.

Figure 2:
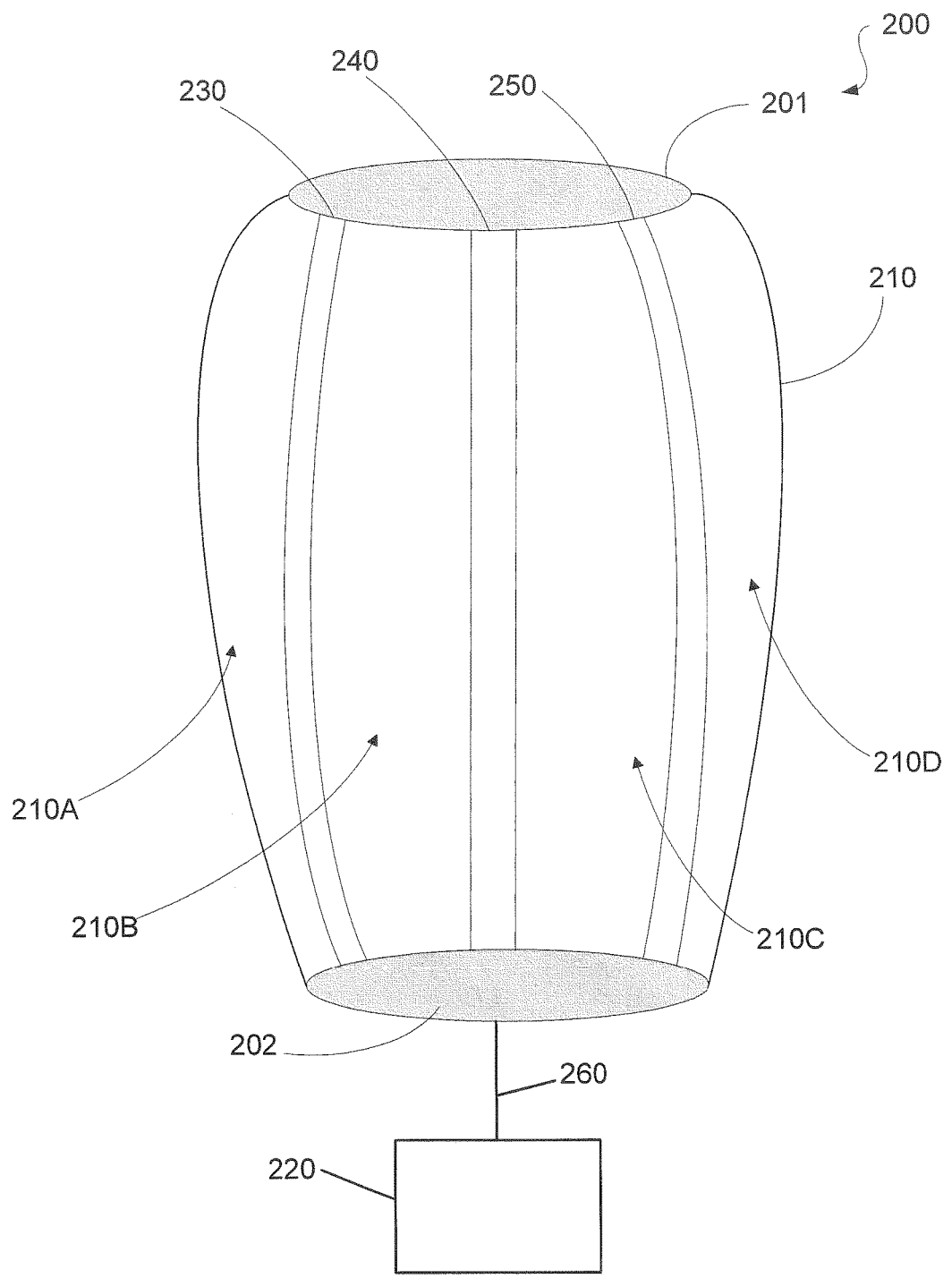
FIG. 2 is an example of a balloon in accordance with aspects of the disclosure.

FIG. 2 is an example high-altitude balloon 200, which may represent any of the balloons of balloon network 100. As shown, the balloon 200 includes an envelope 210, a payload 220 and a plurality of tendons 230-250 attached to the envelope 210.

The high-altitude balloon envelope 210 may take various forms. In one instance, the balloon envelope 210 may be constructed from materials such as polyethylene that do not hold much load while the balloon 200 is floating in the air during flight. Additionally, or alternatively, some or all of envelope 210 may be constructed from a highly flexible latex material or rubber material such as chloroprene. Other materials or combinations thereof may also be employed. Further, the shape and size of the envelope 210 may vary depending upon the particular implementation. Additionally, the envelope 210 may be a chamber filled with various gases or mixtures thereof, such as helium, hydrogen or any other lighter-than-air gas, hereafter, lift gas. The envelope 210 is thus arranged to have an associated upward buoyancy force during deployment of the payload 220.

The payload 220 of balloon 200 is affixed to the envelope by a connection 260 such as a cable. The payload 220 may include a computer system (not shown), having one or more processors and on-board data storage. The payload 220 may also include various other types of equipment and systems (not shown) to provide a number of different functions. For example, the payload 220 may include an optical communication system, a navigation system, a positioning system, a lighting system, an altitude control system and a power supply to supply power to various components of balloon 200.

In view of the goal of making the balloon envelope 210 as lightweight as possible, it may be comprised of a plurality of envelope lobes or gores that have a thin film, such as polyethylene or polyethylene terephthalate, which is lightweight, yet has suitable strength properties for use as a balloon envelope deployable in the stratosphere. In this example, balloon envelope 210 is comprised of envelope gores 210A-210D.

The individual envelope gores 210A-210D may be shaped so that the length of the edge seam connecting adjacent envelope gores is greater than the length of a centerline of the envelope gores. Thus, the envelope gores 210A-210D may be shaped to better optimize the strain rate experienced by the balloon envelope 210. The pressurized lifting gas within the balloon envelope 210 may cause a force or load to be applied to the balloon 200.

The tendons 230-250 provide strength to the balloon 200 to carrier the load created by the pressurized gas within the balloon envelope 210. In some examples, a cage of tendons (not shown) may be created using multiple tendons that are attached vertically and horizontally. Each tendon may be formed as a fiber load tape that is adhered to a respective envelope gore. Alternately, a tubular sleeve may be adhered to the respective envelopes with the tendon positioned within the tubular sleeve.

Top ends of the tendons 230, 240 and 250 may be coupled together using an apparatus, such as top cap 201 positioned at the apex of balloon envelope 210. Bottom ends of the tendons 230, 240 and 250 may also be connected to one another. For example, a corresponding apparatus, e.g., bottom cap 202, is disposed at a base or bottom of the balloon envelope 210. The top cap 201 at the apex may be the same size and shape as and bottom cap 202 at the bottom. Both caps include corresponding components for attaching the tendons 230, 240 and 250, and may be formed from stainless steel or aluminum.

Figure 3:
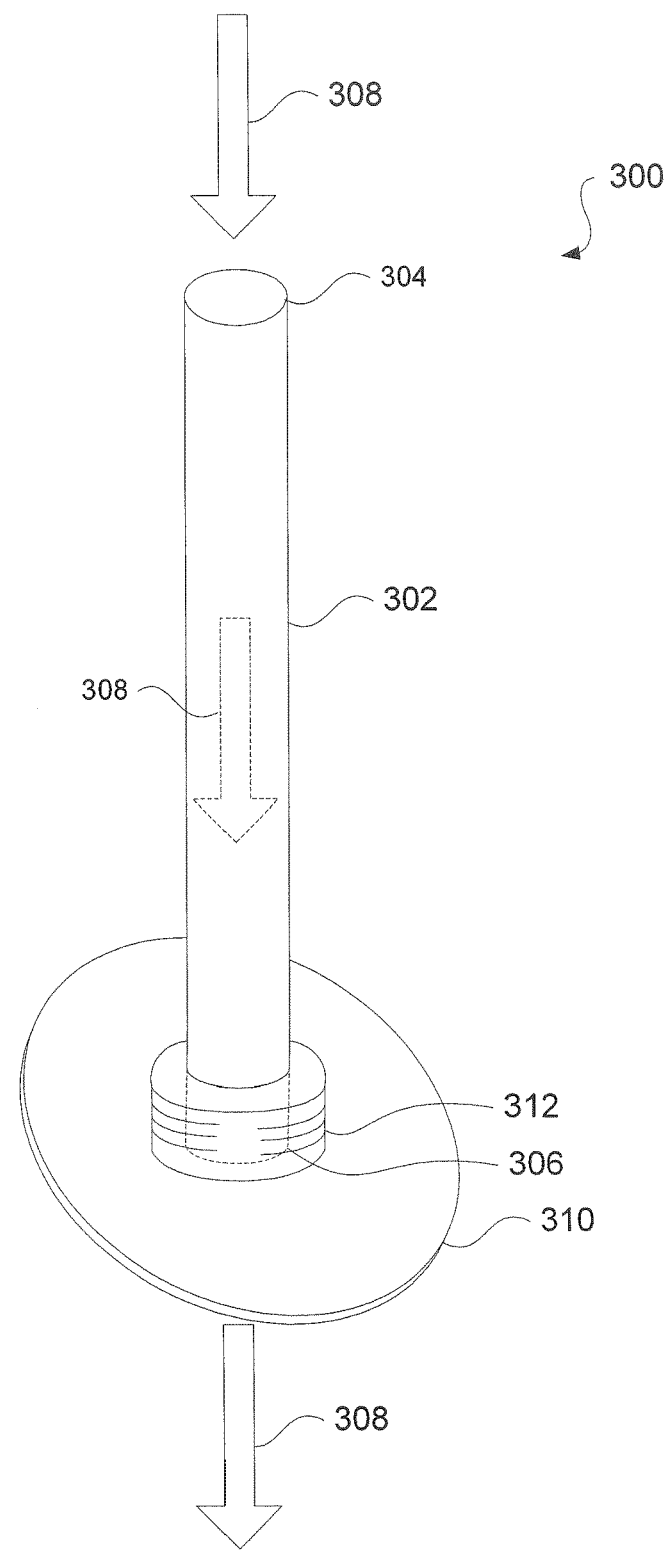
FIG. 3 is an example of a pinch off tube in accordance with aspects of the disclosure.

FIG. 3 is an example of a pinch-off tube 300 which may be used as a fill port for a high altitude balloon such as balloon 200. In this example, pinch-off tube 300 includes a tubular portion 302 having an open first end 304 and an opposing open second end 306. The open second end 306 is shown in dashed line to indicate that it is with threaded body 312. The threaded body 312 has a diameter that is wider than the diameter of the open first end 304 of the tubular portion. In this regard, pinch-off tube 300 includes a passageway such that air or other gasses may flow along the general the path of arrows 308 from the open first end 304 to the opposing open second end 306 and from the open second end 306 to the open first end 304. The arrows 308 shown in dashed line indicate that they are within the tubular portion 302. The threaded body 312 is connected to a flattened disc or flange portion 310. The pinch-off tube 300, threaded body 312, and flange portion may be made of various metals, including, for example copper.

Figure 4:
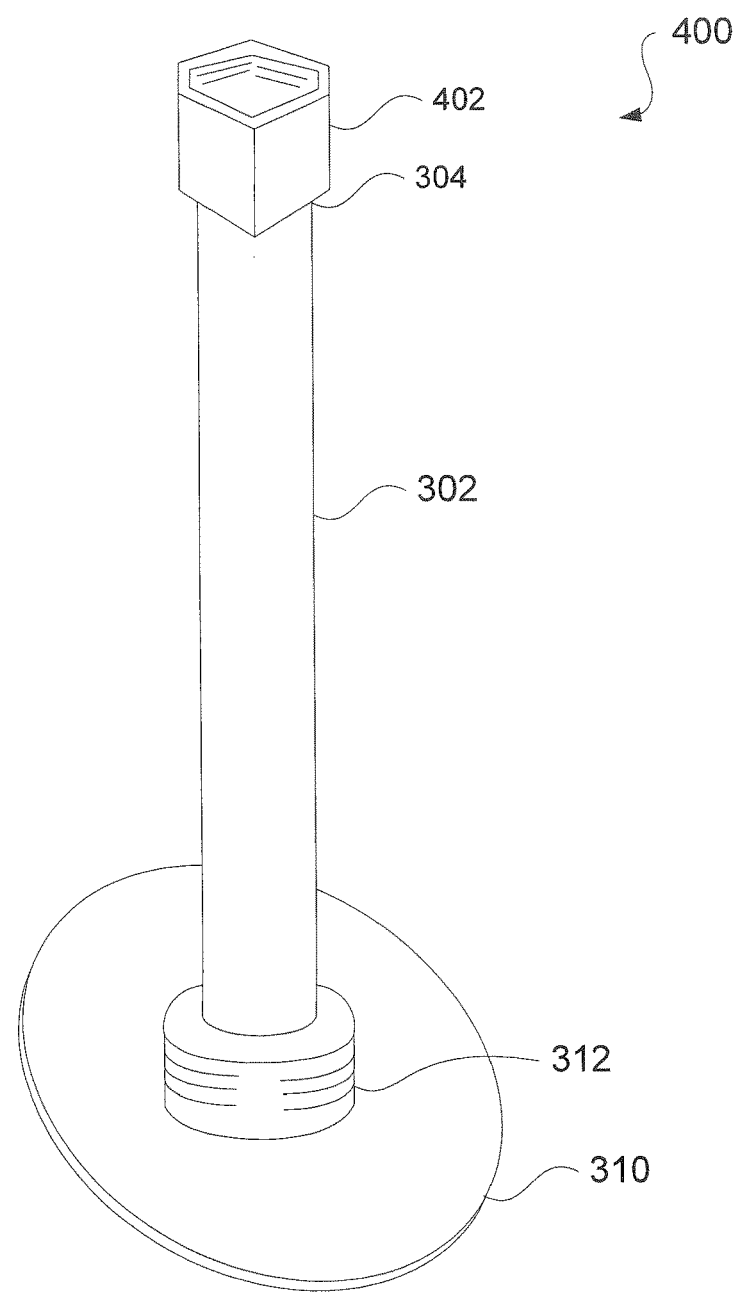
FIG. 4 is an example of a filling apparatus in accordance with aspects of the disclosure.

FIG. 4 is an example of a filling apparatus 400 that includes a fitting 402 is attached to the open first end 304 of pinch-off tube 300. In this regard, the fitting 402 may be fixed to the open first end 304 of the tubular portion 302 by braze welding or other connection techniques prior to or after the filling apparatus 400 is attached to a balloon envelope as described below. Fitting may be configured to connect the filling apparatus 400 with a lift gas fill source in order to fill a high altitude balloon such as balloon 200 with lift gas.

The filling apparatus may be attached to a balloon envelope during the manufacturing of the balloon. For example, before the balloon envelope is completed, a hole may be cut into a portion of the balloon envelope material. The filling apparatus may be placed through the hole from what will become the interior of the balloon envelope. In this regard, the second end of the filling apparatus having the fitting may be passed through the hole as well as the tubular portion of the pinch-off tube. Once the flange of the pinch-off tube is positioned below the hole, a nut or other fixation device may be used further secure the balloon envelope material to the filling apparatus and in particular, to the threaded body of the pinch-off tube.

Figure 5:
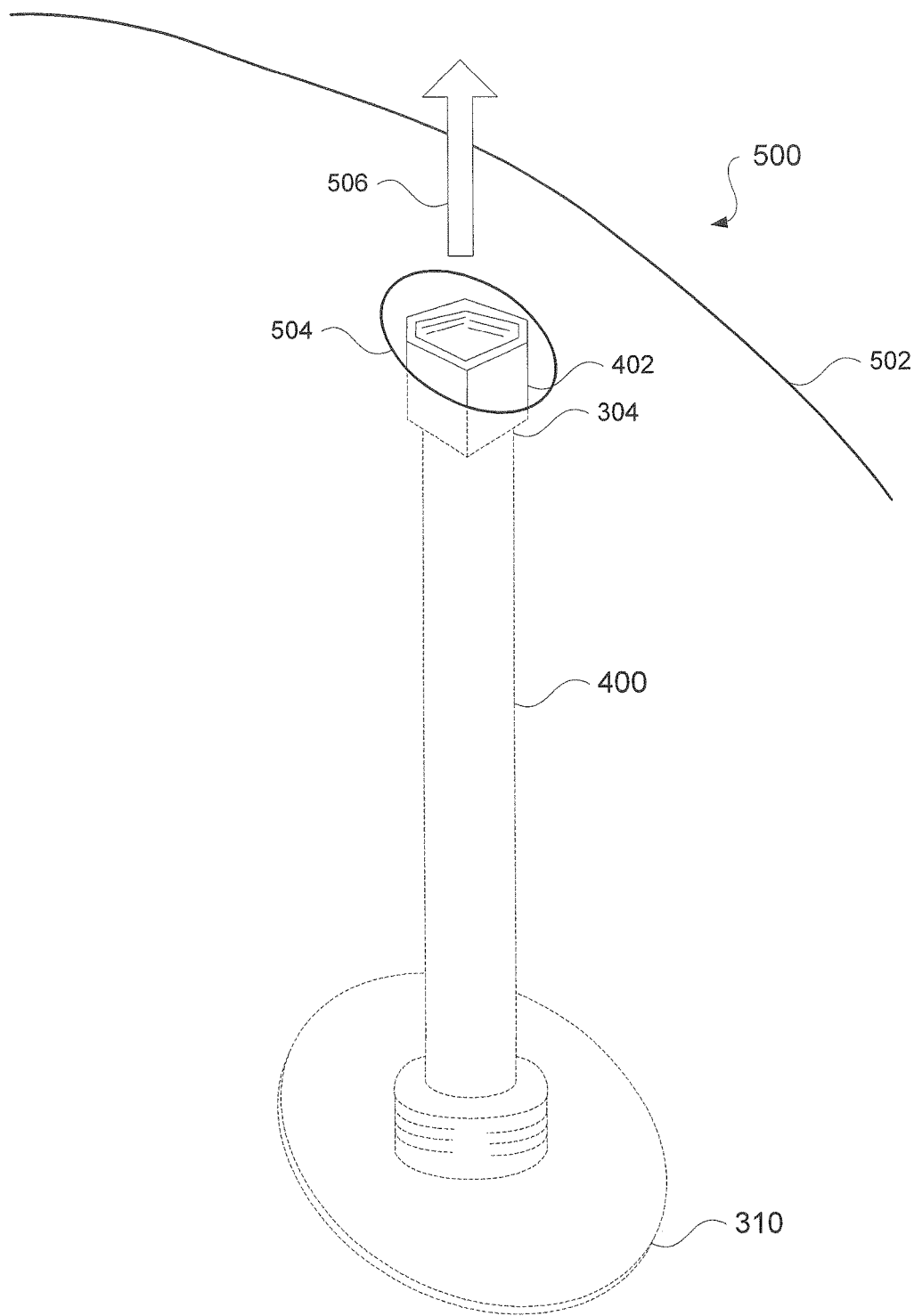
FIG. 5 is an example diagram of the filling apparatus of FIG. 4 and a portion of balloon envelope material in accordance with aspects of the disclosure.

FIG. 5 is an example 500 of the filling apparatus 400 being positioned relative to a portion of the balloon envelope material 502. In this example the second open end 306, flange 310, the tubular portion 302, and part of the fitting 402 are shown in dashed line as these features are located below the portion of envelope material 502 or what will become an interior of the balloon envelope. As noted above, after the filling apparatus is secured to the portion of balloon envelope material 502, the portion of the balloon envelope material may be one of envelope gores 210A-210D attached to other such envelope gores in order to form a completed balloon envelope such as balloon envelope 210.

Hole 504 may be cut into the portion of balloon envelope material 502 using any conventional cutting technique. Hole 504 may be sized such that the fitting 402 and tubular portion 302 may be passed through the hole. Hole 504 may be smaller than the area of flange 310 such that the flange cannot pass through hole 504, though larger holes may also be used.

In some examples, prior to inserting the filling apparatus 400 into the hole 504 or after the balloon envelope is completed, a high vacuum grease may be applied to all or a portion of the filling apparatus. Fitting 402 is then passed through the hole from a side of the portion of balloon envelope material 502 that will become the interior of the balloon envelope 210 when the envelope is completed. Thus, in the example of FIG. 500, fitting 402 is passed through the hole 504 in the direction of arrow 506.

Figure 6:
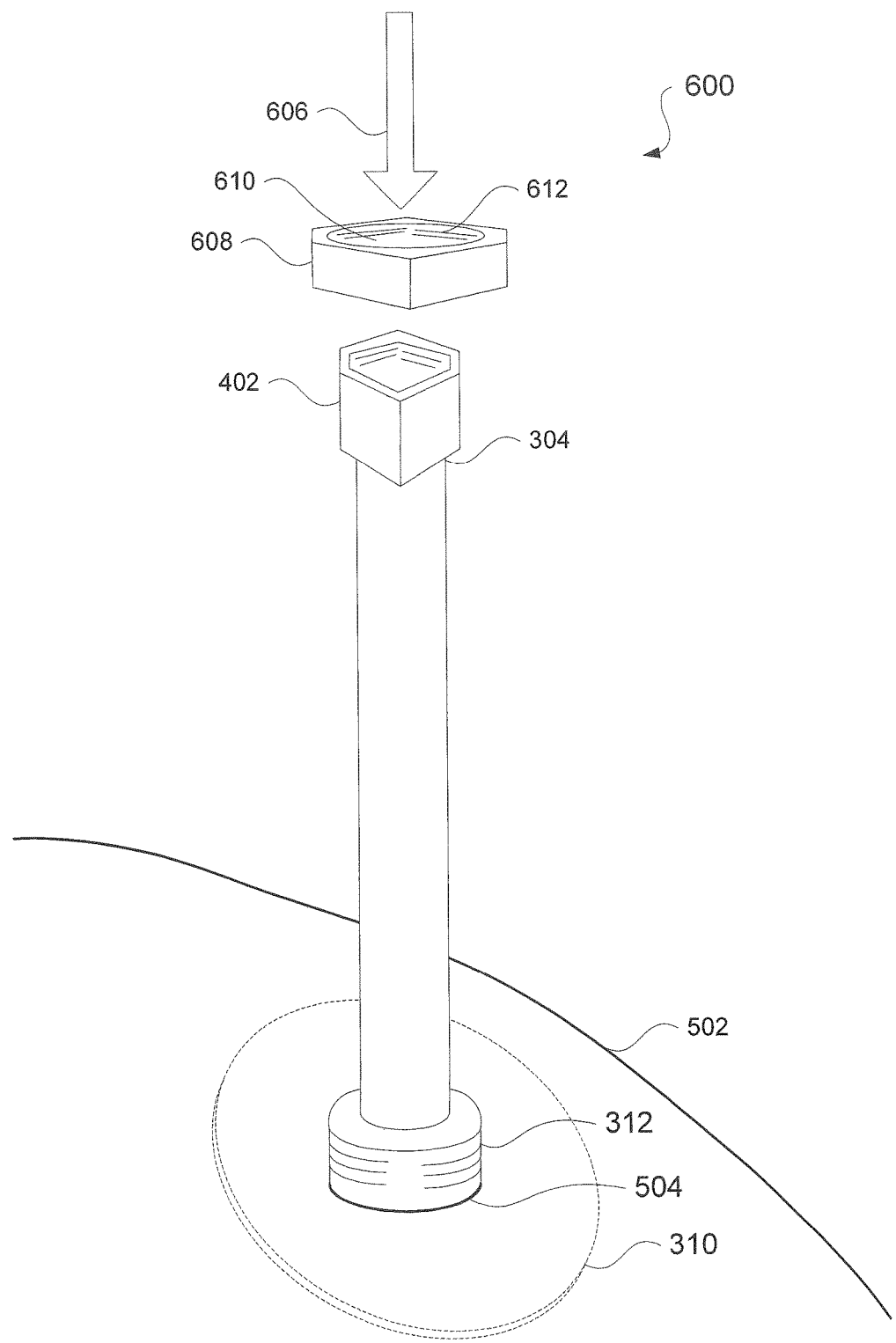
FIG. 6 is another example diagram of the filling apparatus of FIG. 4 and a portion of balloon envelope material in accordance with aspects of the disclosure.

FIG. 6 is an example 600 of the filling apparatus 400 being secured to a portion of the balloon envelope material 502. Once the fitting 402 passes through the hole 504 (as shown in FIG. 5), the tubular portion 302 is also passed through the hole until at least a portion of the threaded body 312 is through the hole and the flange 310 meets with the portion of balloon envelope material 502 as shown in FIG. 6. Thus, in this example the second open end 306 and flange 310 are shown in dashed line as these features are located below the portion of envelope material 502 or what will become an interior of the balloon envelope.

In order to secure the pinch-off tube to the portion of balloon envelope, a fixation device such as a nut may be used. A nut 606 may be placed over the fitting 402 and moved down in the direction of arrow 608 until the clamp is positioned around the gathered material. Nut 606 includes an opening 610 wide enough to pass over the fitting 402. The opening also includes threading 612 that is configured to mate with the threading of the threaded body 312. The nut 606 may then be tightened around the threaded body 312 in order to secure the balloon envelope material to the filling apparatus, for example, by way of a clamping force as is shown in example 700 of FIG. 7.

Once the filling apparatus is secured to the balloon envelope material, the balloon envelope and balloon may be completed. For example, as noted above, the portion of balloon envelope material 502 may be secured to other such portions (though without the filling apparatus) using an impulse sealing process or other process in order to create a completed balloon envelope as shown in FIG. 2. The completed balloon envelope thus includes a chamber for receiving lift gas. The balloon envelope may then be configured with the various other features discussed above in order to produce a completed balloon.

The completed balloon may then be inflated using the filling apparatus. For example, the completed balloon envelope may then be attached to a lift gas fill source via the fitting in order to fill the envelope with lift gas. Thus, lift gas may progress from the lift gas fill source, through the tubular portion, and into the balloon envelope in order to inflate the chamber of the balloon envelope. Once a desired level of inflation has been reached, the filling apparatus may be pinched off, for example, using a cold welding process. For instance, while the filling apparatus is still connected to the lift gas fill source, the tubular portion of the filling apparatus may be crushed by a scissor like tool such as a pinch-off tool until the tubular portion is severed into two sections. The section having the fitting may thus still be connected to the lift gas fill source. This section may be discarded. The other section connected to the balloon envelope material may form an air tight chamber.

Figure 7:
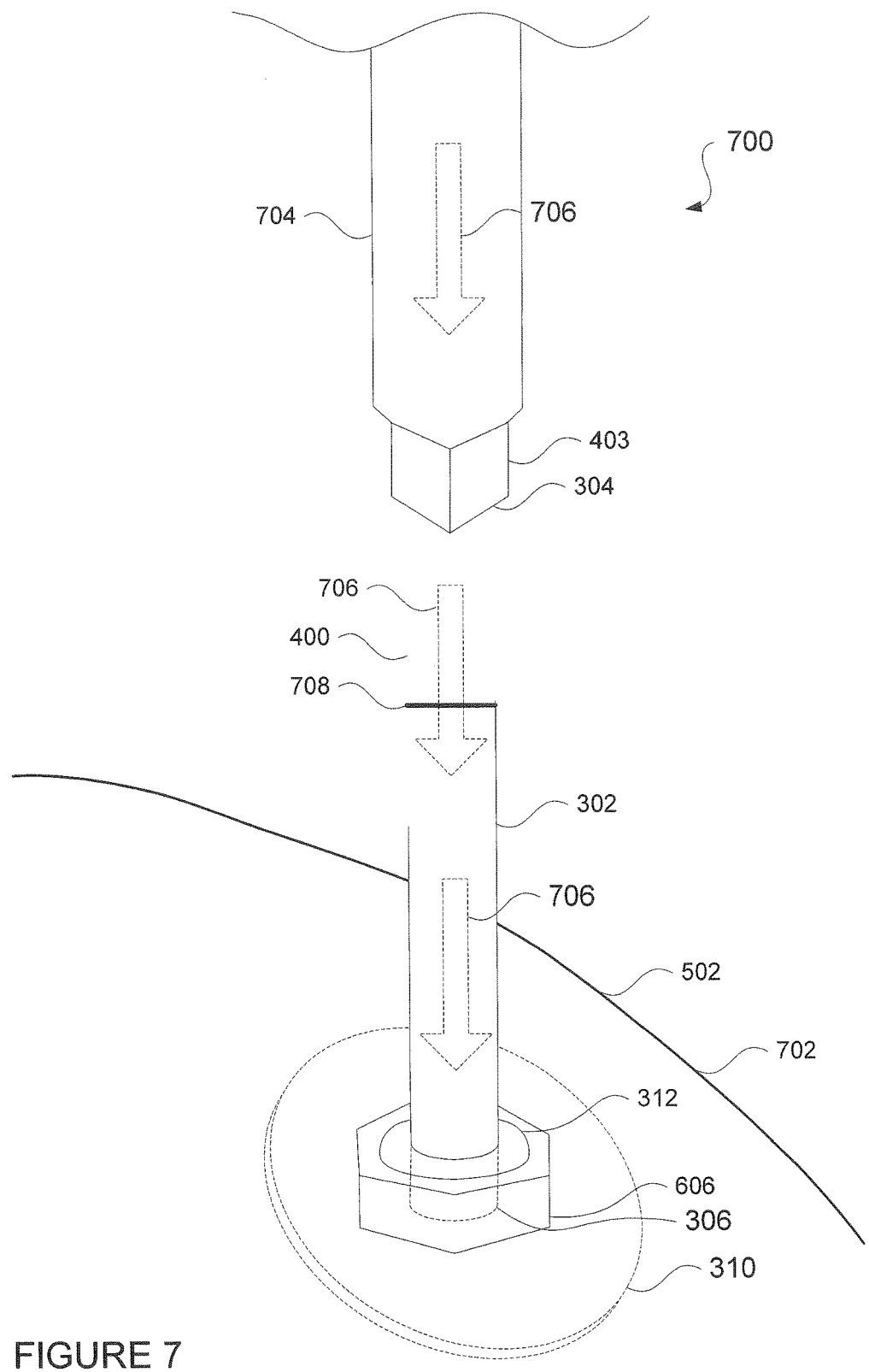
FIG. 7 is an example diagram of a completed balloon envelope, filling apparatus, and lift gas fill source in accordance with aspects of the disclosure.

FIG. 7 is an example 700 of a completed balloon envelope 702 that includes the portion of balloon envelope material 502 having the filling apparatus 400. Again, the second open end 306 and flange 310 are shown in dashed line as these features are located below the portion of balloon envelope material 502 and on an interior of the completed balloon envelope 702.

In this example, the fitting 402 is connected to a lift gas fill source 704. Lift gas fill source 704 may include a hose or other device that provides lift gasses such as hydrogen or helium to fill the completed balloon envelope 502. The hose may be configured to detachably mate with fitting 403, for example, via complementary threading. As such, tubular portion 302 connects an interior or chamber of the completed balloon envelope 702 with the lift gas fill source 704. The tubular portion 302 extends through a hole 406 in the portion of envelope material 402. The nut 606 again secures the filling apparatus to the portion of balloon envelope 502 and provides an air tight seal as the chamber is inflated.

In order to fill the balloon envelope, the lift gas fill source 704 may be connected to fitting 410 of the filling apparatus 400 as shown in FIG. 7. The lift gas fill source 704 may then be used to provide lift gasses to inflate the completed balloon envelope 702. The lift gasses may flow from the lift gas fill source 704 through the fitting 410, the tubular portion 302, and into a chamber of the completed balloon envelope 702 along arrows 706.

Figure 8:
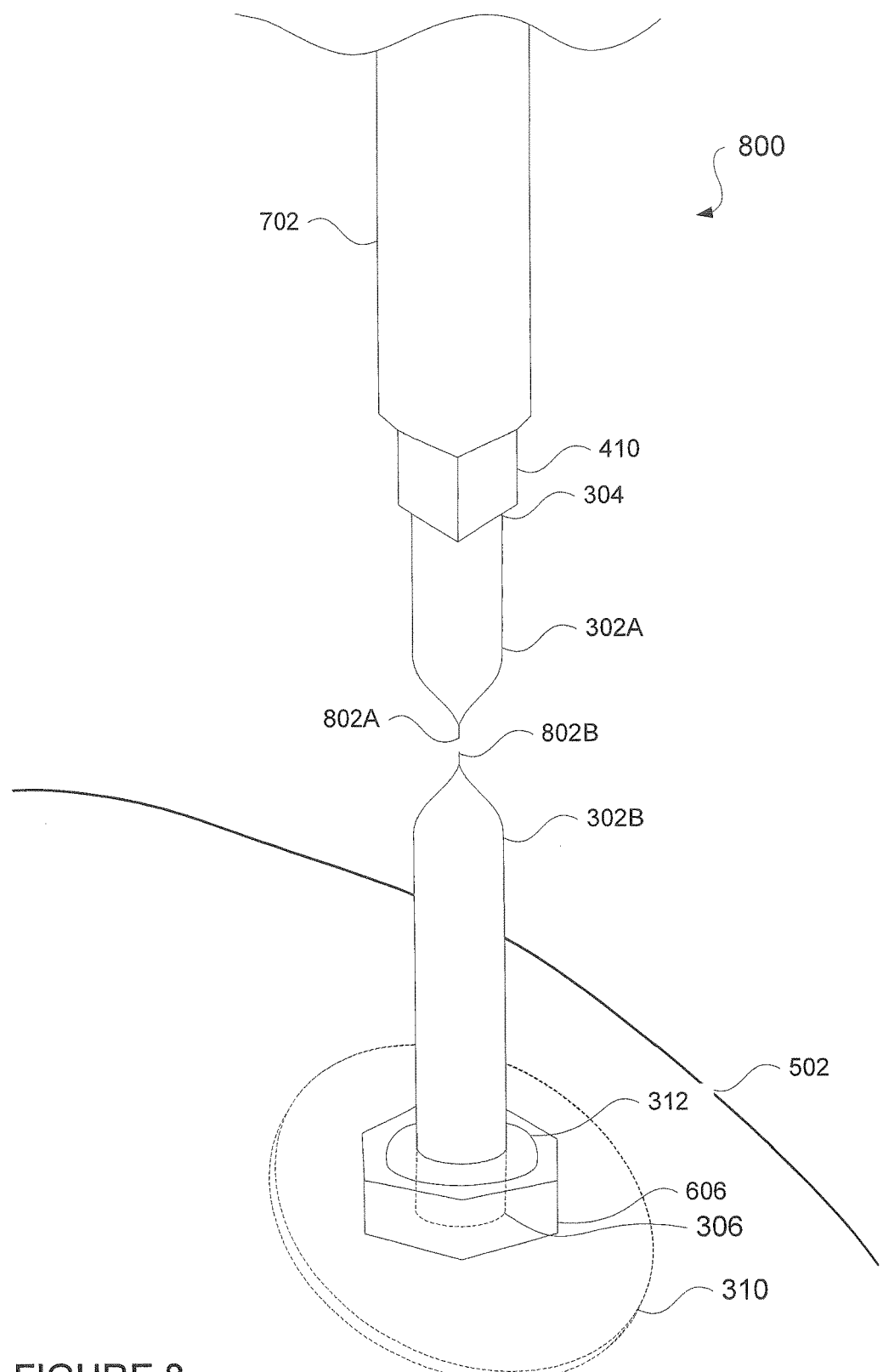
FIG. 8 is an example diagram of a pinched off filling apparatus, a completed balloon envelope, and lift gas fill source in accordance with aspects of the disclosure.

Once a desired inflation of the completed balloon envelope 702 is reached, the tubular portion 302 may be pinched off. For example, a scissor like tool such as a pinch-off tool may be used to cold weld the tubular portion 302 by crushing the tubular portion 302 into two sections and forming a seal on each of the two sections. Example 800 of FIG. 8 depicts two sections 302A and 302B of the tubular portion which have been severed from one another using a pinch-off tool at line 708 (shown in FIG. 7). In this example, the tubular portion has been crushed such that each section 302A and 302B has an air tight seal 802A and 802B, respectively. Section 302A which is still attached to lift gas fill source 704 via the fitting 410 may be removed from lift gas fill source and discarded. Air tight seal 802A may prevent lift gasses from escaping from the completed balloon envelope 702 during use of the balloon even in high-altitude environments as described above.

Figure 9:
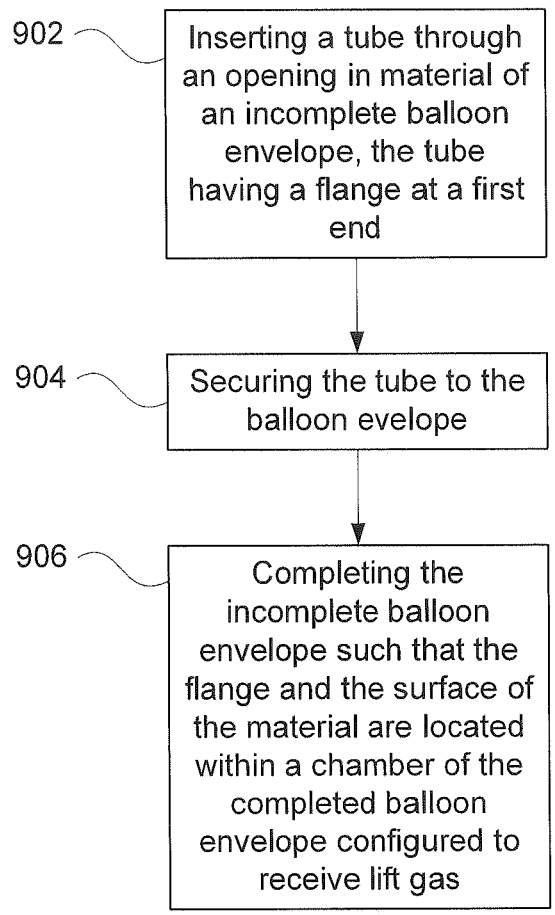
FIG. 9 is a flow diagram in accordance with aspects of the disclosure.

Flow diagram 900 of FIG. 9 is an example flow diagram of some of the aspects described above which may be used to manufacture a high-altitude balloon having a balloon envelope. In this example, a tube is inserted through an opening in material of an incomplete balloon envelope at block 902. The tube has a flange at a first end. The opening may be made in the material by cutting the material using an instrument having a sharp blade or a punch tool. As noted above, a fitting may also be attached to a second end of the tube via braze welding. This fitting can be configured to attach to a filling apparatus for filling a completed balloon envelope with lift gas. The tube secured to the incomplete balloon envelope at block 904. As an example, an O-ring clamp may be used to clamp the balloon envelope material to the tube. The incomplete balloon envelope is then completed such that the flange and the surface of the material are located within a chamber of the completed balloon envelope configured to receive lift gas at block 906.

Figure 10:
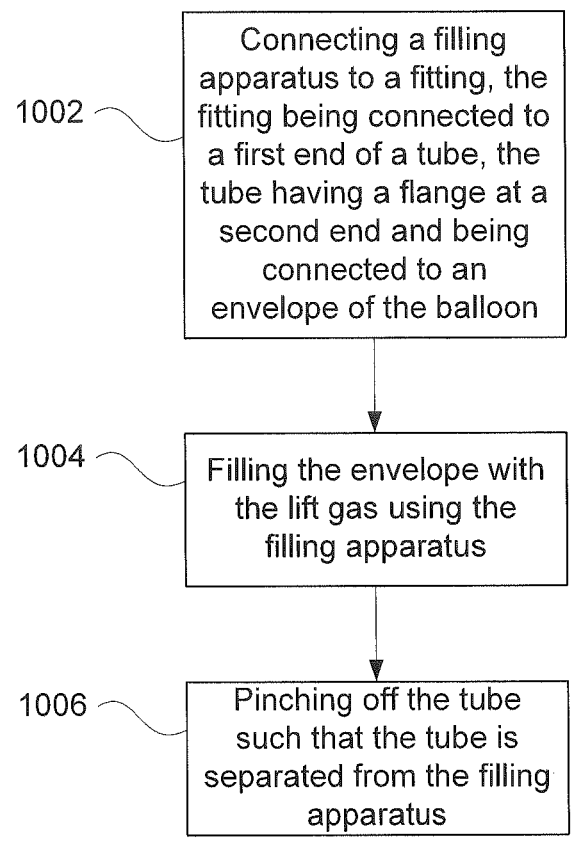
FIG. 10 is another flow diagram in accordance with aspects of the disclosure.

Flow diagram 1000 of FIG. 10 is an example flow diagram of some of the aspects described above which may be used to fill a high-altitude balloon with lift gas. In this example, a filling apparatus is connected to a fitting at block 1002. The fitting is connected to a first end of a tube. The tube having a flange at a second end and being connected to an envelope of the balloon. The envelope is filled with the lift gas using the filling apparatus at block 1004. As noted above, in some examples, the lift gas may include hydrogen. The tube is pinched off such that the tube is separated from the filling apparatus at block 1006. The pinching off may include a cold welding process which reduces a likelihood of combustion of the lift gas. The pinching off may also prevent the lift gas from escaping from the envelope after the filling.

Thus, the features described above allow no chance for the lift gas to escape after inflation but before the chamber of the completed balloon envelope is sealed. This also reduces the likelihood of injury due when using a gas such as hydrogen. In addition, the cold welding does not need to be performed manually by a person using a pinch-off tool, but may be done automatically by another apparatus. The filling apparatus tube provides a single use, simple, and nonmoving part that is reliable, economical, and safe when using flammable filler gasses such as hydrogen.

Figure 11:
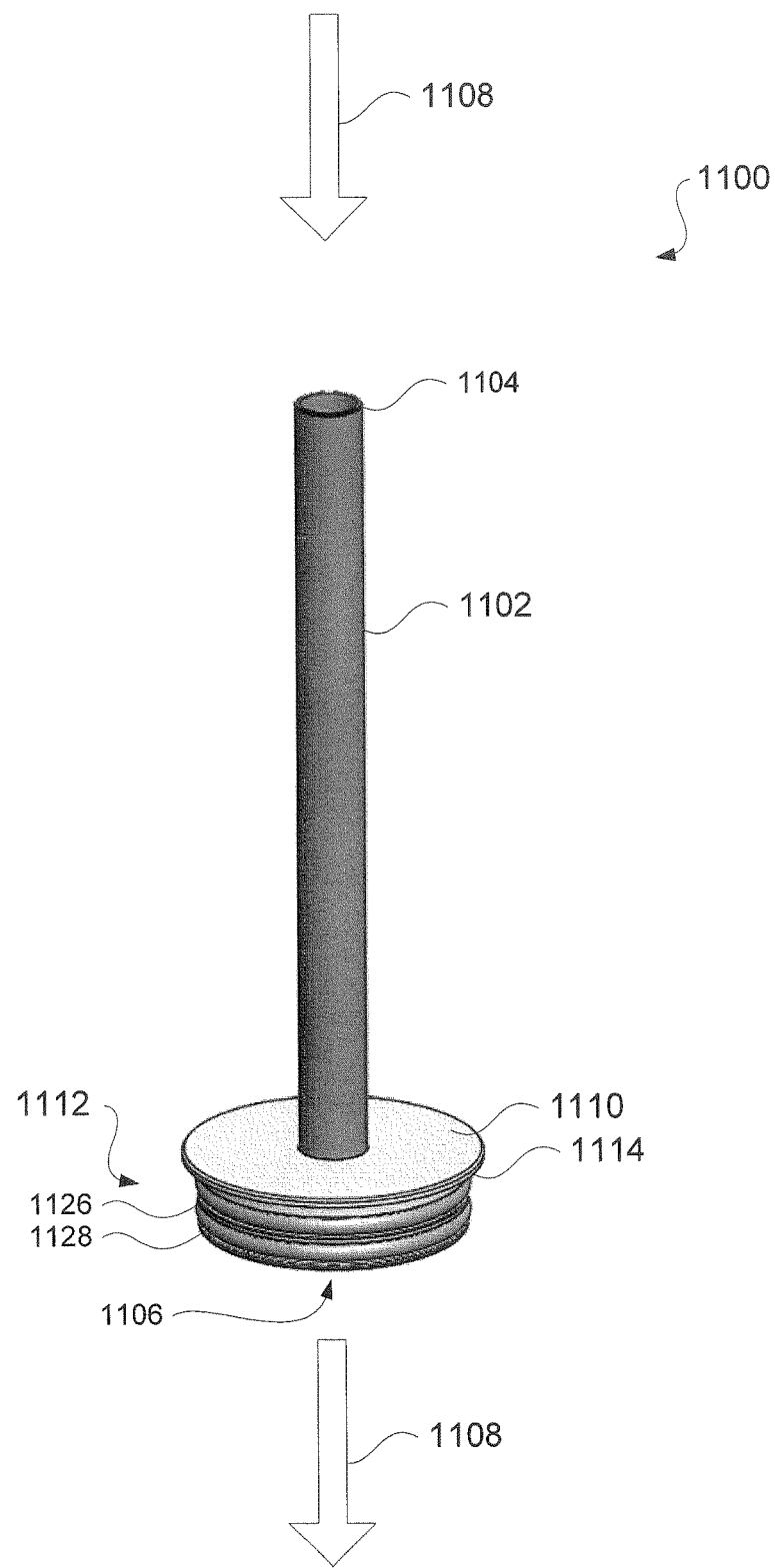
FIG. 11 is an example of a pinch off tube assembly in accordance with aspects of the disclosure.

FIG. 11 is an example of a pinch-off tube assembly 1100 which may be used as a fill port for a high altitude balloon such as balloon 200. In this example, pinch-off tube assembly 1100 includes a tubular portion 1102 having an open first end 1104 and an opposing open second end 1106. Pinch-off tube assembly 1100 includes a passageway such that air or other gasses may flow along the general the path of arrows 1108 from the open first end 304 to the opposing open second end 1106 (more clearly shown in FIG. 13) as well as from the open second end 306 to the open first end. Second end 1106 is connected to a disc or flange portion 1110 of a plug 1112. The flange portion 1100 includes a lip 1114 that extends outwardly from the flange portion.

The tubular portion 1102 may include various metals, including, for example copper. The tubular portion 1102 may be attached, for example by braze welding, to the flange portion 1110. The plug 1112 (and the flange portion 1110) may be made of materials different from the tubular portion 1102, such as stainless steel or aluminum.

Figure 13:
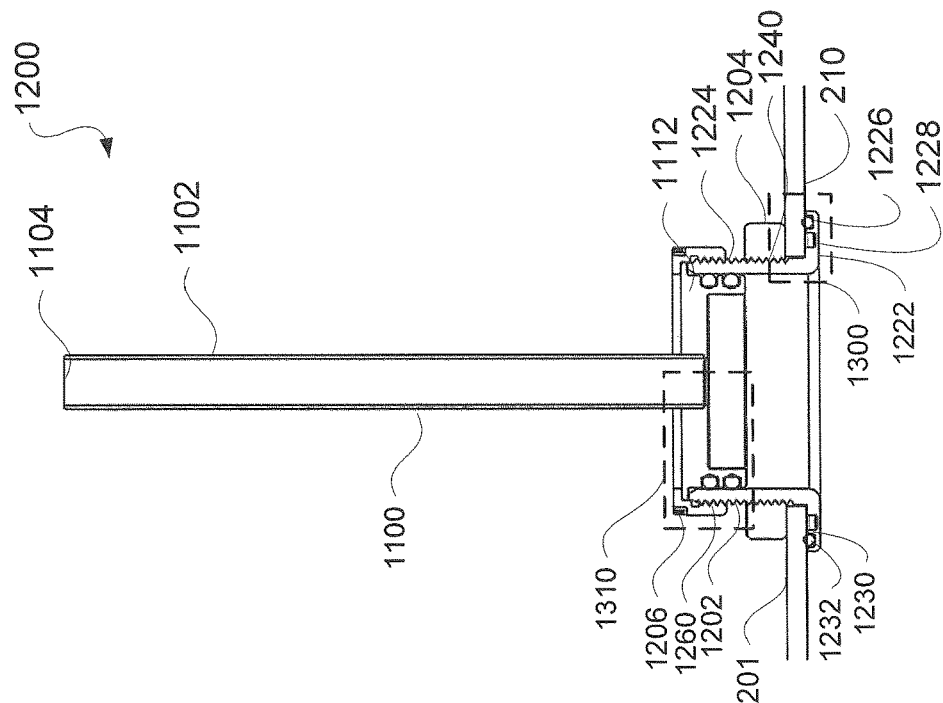
FIG. 13 is a cross sectional view of the filling apparatus of FIG. 12.

The plug 1112 may also include one or more grooves (shown as grooves 1116 and 1118 in FIG. 13). Sealing devices, such as O-rings 1126 and 1128 may be placed in such grooves. The O-rings 1126 and 1128 may be formed of flouroscilicone or other flexible materials well suited to low temperature environments as described in more detail below.

Figure 12:
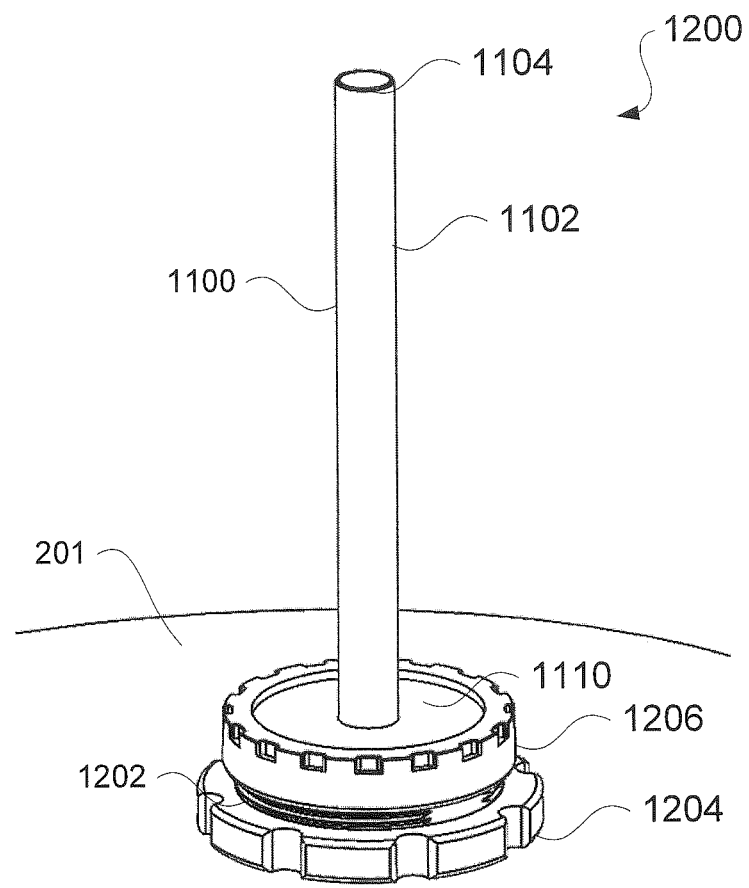
FIG. 12 is an example of a filling apparatus attached to a balloon cap in accordance with aspects of the disclosure.
Figure 14:
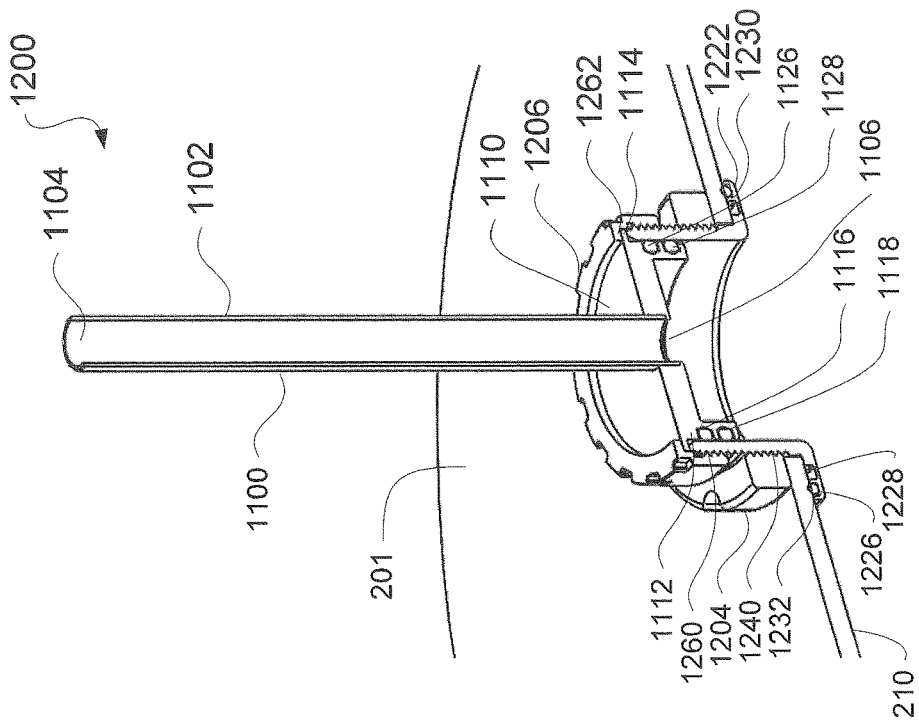
FIG. 14 is a side view of the cross sectional view of the filling apparatus of FIG. 13.
Figure 15:
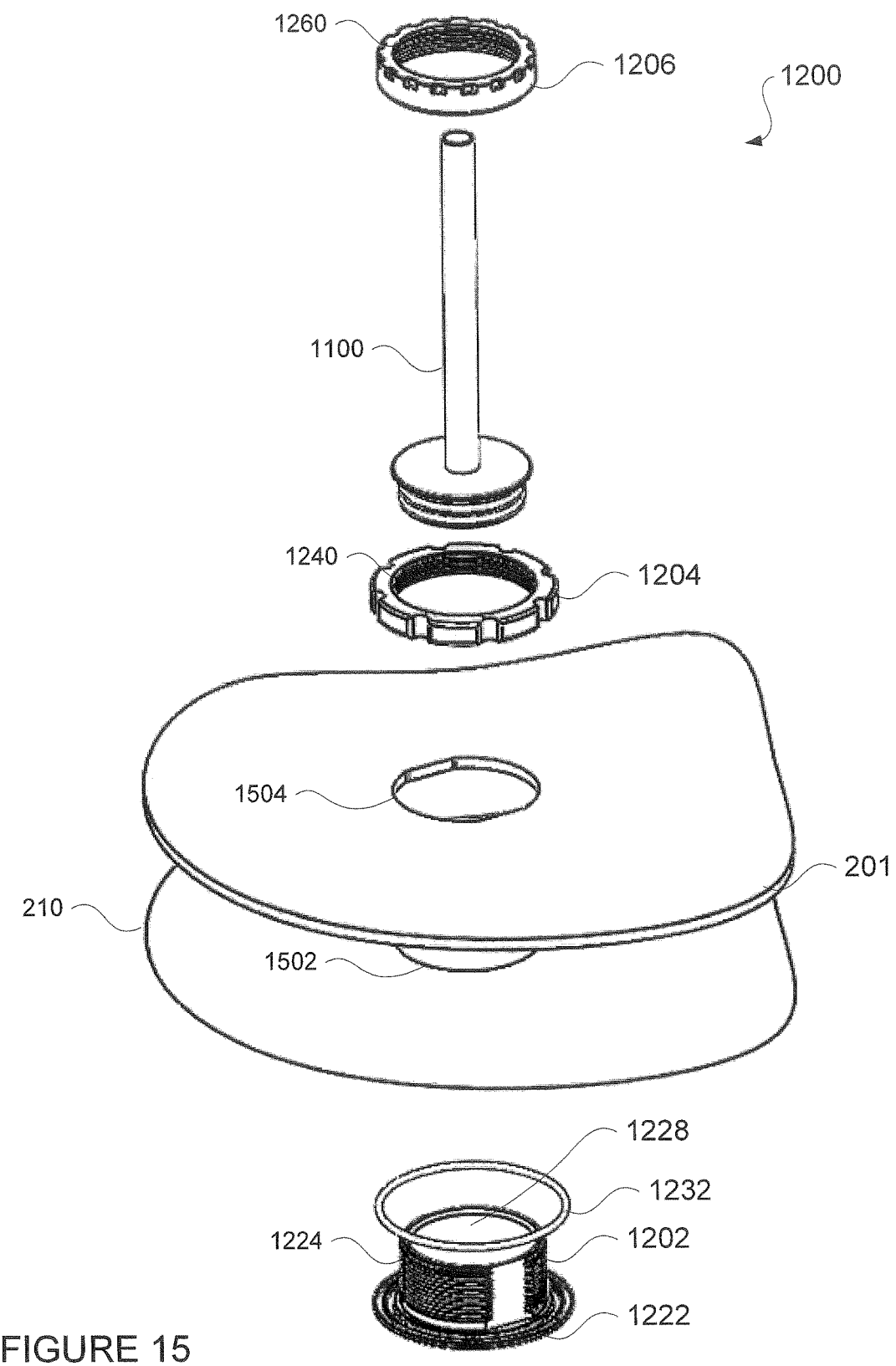
FIG. 15 is an exploded view of the filling apparatus and balloon cap of FIG. 12.

FIGS. 12-14 are examples of a filling apparatus 1200 for filling a balloon envelope of a balloon, such as balloon 200, with lift gas. FIG. 13 is a cross sectional view of FIG. 12, and FIG. 14 is an offset view of the cross sectional view of FIG. 12. FIG. 15 is a break out view of the components of filling apparatus 1200.

Referring to FIGS. 12 and 15, in addition to the pinch-off tube assembly 1100, the filling apparatus includes a fill port body 1202, a fill port body retaining nut 1204, and a fill tube cap 1206. Each of the fill port body 1202, the fill port body retaining nut 1204, and the fill tube cap 1206 may be made of a crystallized plastic or high-performance acetal resin such as commercially available Delrin® products.

The fill port body 1202 includes a lower flange portion 1222 and a threaded body portion 1224 having threading. The lower flange portion has grooves 1226 and 1228 separated by a thin flexure section 1230. A sealing device such as envelope sealing O-ring 1232 is situated in the groove 1226. Envelope sealing O-ring may also be formed of flouroscilicone or other materials well suited to low temperature environments. However, as described in more detail below, the envelope sealing O-ring 1232 may also be made of other materials without such properties. The fill port body 1202 may also include a passageway 1228 that passes through the threaded body portion 1224 and the lower flange portion 1222 in order to lift gas to pass from one end of the passageway to the other.

The fill port body retaining nut 1204 includes internal threading 1240. The internal threading 1240 is complementary to threading of the threaded body portion 1224 of the fill port body 1202. In this regard, the fill port body 1202 may be secured to a portion of the top cap 201 and a portion of the envelope 210 (shown most clearly in FIG. 15) of balloon 200 via the fill port retaining nut 1204 and envelope sealing O-ring 1232.

The fill tube cap 1206 includes internal threading 1260 that is complementary to the threading of the threaded body portion 1224. The fill tube cap also includes a contact surface 1262 configured to contact the lip 1114 of the flange portion 1110.

Filling apparatus 1200 may also include a fitting (not shown) attached to the open first end 1104 of the pinch-off tube assembly 1100. This fitting may be configured similar to fitting 402 of FIG. 4. In this regard, the fitting may be fixed to the open first end 1104 of the tubular portion 1102 by braze welding or other connection techniques. The fitting may be configured to connect the filling apparatus 1200 with a lift gas fill source in order to fill a high altitude balloon such as balloon 200 with lift gas.

Figure 16:
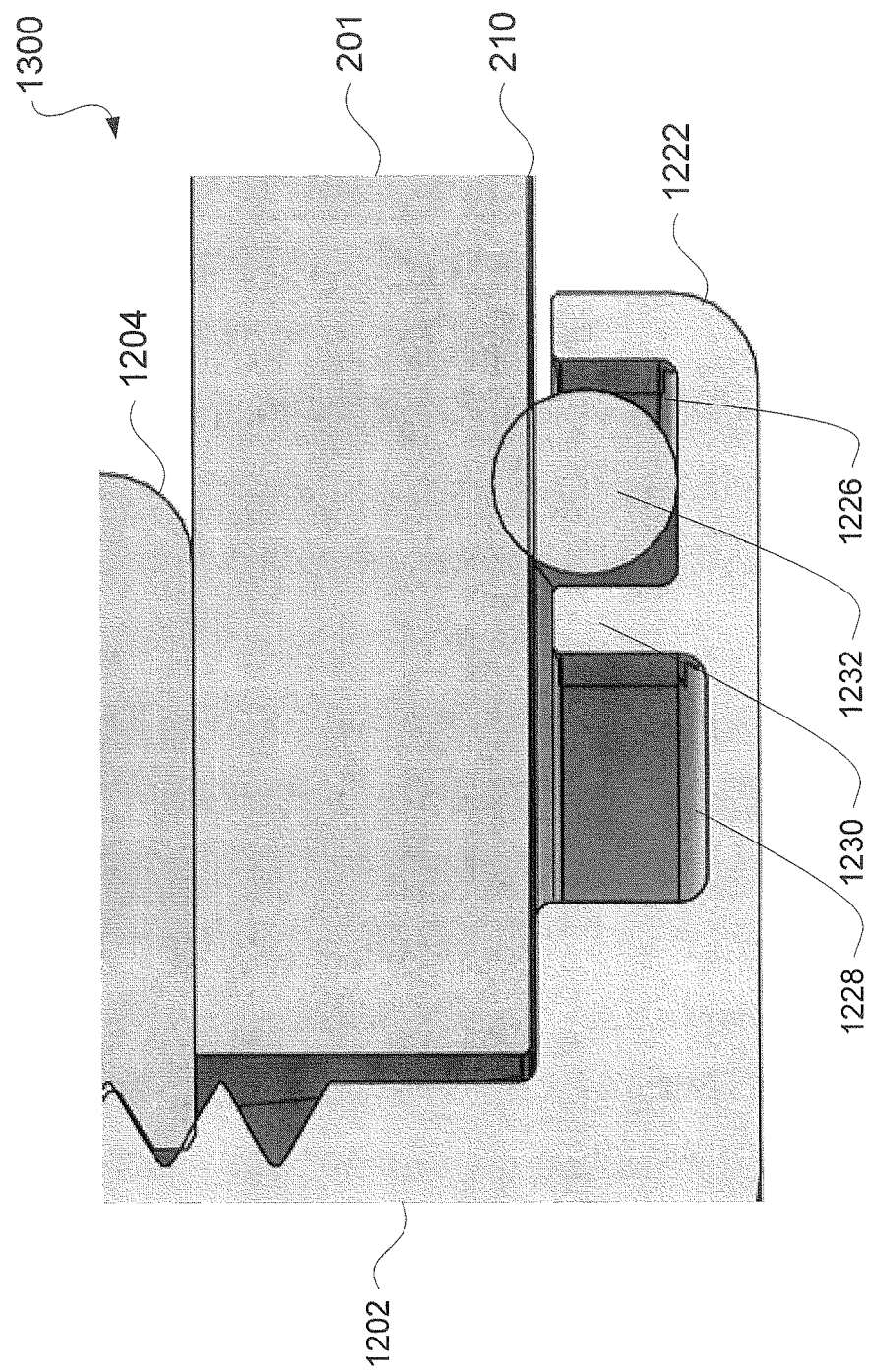
FIG. 16 is a close up view of a portion of the cross sectional view of the filling apparatus of FIG. 13.

FIG. 16 is a close up view of box 1300 of FIG. 13. Although not shown as such, envelope sealing O-ring 1232 is compressed by the force of fill port body retaining nut 1204 on the top cap 201 and balloon envelope 210. This compression force on the envelope sealing O-ring 1232 creates a seal between the balloon envelope 210, and the fill port body 1202. In addition, this force may also compress the thin flexure section 1230. In some examples, this thin flexure section 1230 may be compressed as much as the O-ring by the force of the fill port body retaining nut 1204 on the top cap 201. For instance, the thin flexure section 1230 may have a cross section of approximately 0.125 in and may be compressed a distance on the order of 0.015 in or more or less. The thing flexure section 1230 may keep the O-ring in place at temperatures well below the O-ring's elastic temperature (e.g. at −50 degrees Celsius where the O-ring loses its elastic characteristics and becomes ridged) such that the seal is maintained. Thus, the envelope sealing O-ring 1232 may be made of materials other than flouroscilicone or other materials well suited to low temperature environments.

Figure 17:
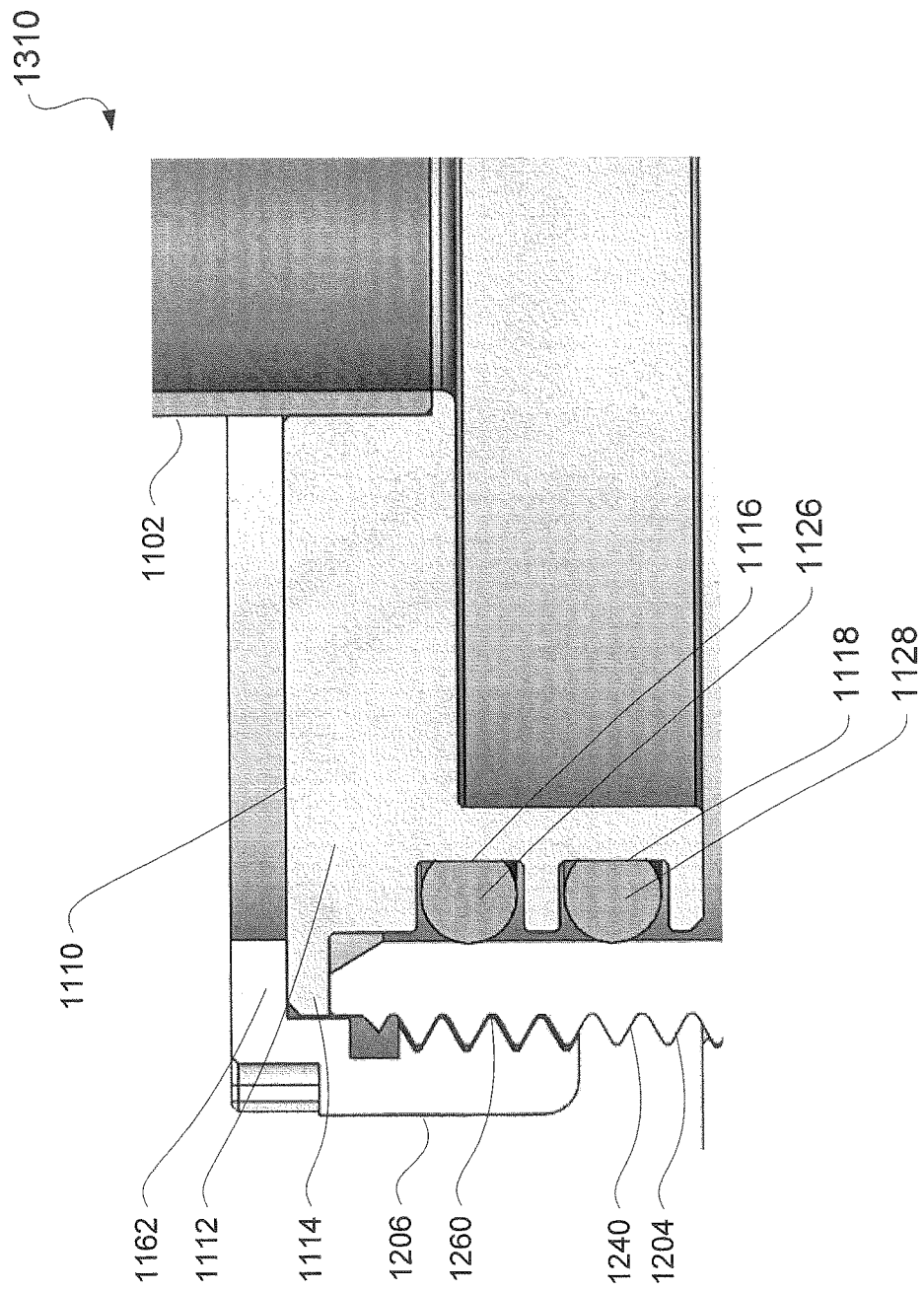
FIG. 17 is another close up view of a portion of the cross sectional view of the filling apparatus of FIG. 13.
Figure 18:
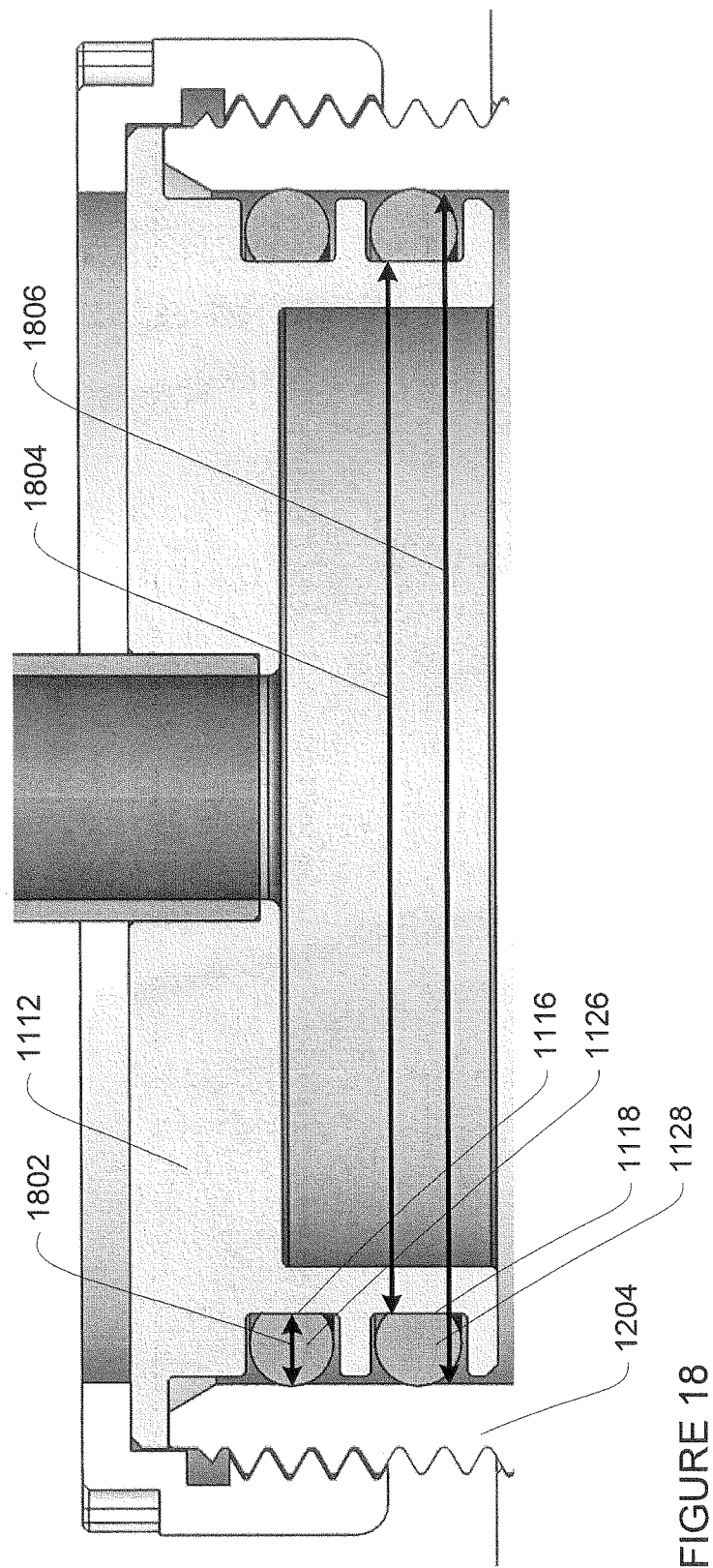
FIG. 18 is another close up view of a portion of the cross sectional view of the filling apparatus of FIG. 13.

FIG. 17 is a close up view of box 1310 of FIG. 13. Although not shown as such, O-rings 1126 and 1128 compressed within the grooves 1116 and 1118, respectively, between the plug 1112 and an interior surface of fill port body 1202. The minimum and maximum compression values may be approximately 15 and 19 percent of the cross sectional width of the ring (measured though line 1802 of FIG. 18), respectively. The compressed O-rings each form a seal between the plug 1112 of the filling apparatus 1100 and the fill port body retaining nut 1204. In this regard, only a single O-ring may be required to provide a sufficient seal, however the second O-ring may provide for further protection against leaks should the first O-ring fail.

As noted above, the low temperatures in the stratosphere can cause various components of the filling apparatus 1200 to change shape. For example, the O-rings may lose their shape at −80 degrees Celsius, shrinking within the grooves a distance on the order of 0.001 of an inch. Similarly, the other components of the filling apparatus 1200 may also shrink. Such shrinkage may cause very small leaks in the balloon envelope 210 which can allow lift gas to escape. As noted above, this can be problematic for long term (e.g. weeks or months or more) flights in the stratosphere. The amount of shrinkage may be determined using the coefficient of thermal expansion for each of the materials used in the filling apparatus.

However, the seals between the filling apparatus 1100 and the fill port body retaining nut 1204 may enable continuous seal contact well below the elastic temperature of the O-rings. For example, the materials and dimensions selected for the O-rings, fill port body, and plug may be selected such that the change in the cross sectional area of the grooves is equal to the change in the cross sectional area of the grooves. Table 1 below provides example dimensions, materials, and coefficients of thermal expansion (CTE) for such materials. Assuming zero elasticity of the O-ring material below −20 degrees Celsius, any movement would be due to the thermal coefficient of expansion at or below this temperature. The combination of components in Table 1 provide for complementary changes in the shapes of these components below −20 degrees Celsius, expected conditions in the stratosphere. In other words, the change in the distance between the grooves and the fill port body is approximately equal to the change in the diameter of the O-ring thereby reducing the likelihood of even small leaks around these O-rings during a flight in the stratosphere.

TABLE 1

Example Dimensions, Materials and CTEs

| Component | Dimension | Material | CTE |
|---|---|---|---|
| O-rings 1106 and 1108 | 0.139 ± 0.003 inch diameter cross section of O-ring for a #244 O-ring (e.g., measured through line 1802 of FIG. 18 when uncompressed and at SATP) | flouroscilicone | 810 ppm/K |
| Plug 1112 | 1.780 inch diameter cross section at the grooves 1116 and 1118 (e.g., measured through line 1804 of FIG. 18 when uncompressed and at SATP) | 304 Stainless Steel | 17.3 ppm/K |
| Fill port body 1202 | 2.007 inch diameter interior cross section (e.g., measured through line 1806 of FIG. 18 at SATP) | Delrin ® | 122 ppm/K |

As with filling apparatus 300, filling apparatus 1200 may be attached to a balloon envelope during the manufacturing of the balloon. For example, before the balloon envelope is completed, a hole may be cut into a portion of the balloon envelope material using any conventional cutting technique. In addition, a hole may be made in the cap, for example during or after the material of the cap is form. These holes may be aligned with one another, and the various components of filling apparatus 1200 may be connected to one another (as shown in FIGS. 13 and 14.

Referring to FIG. 15, the balloon envelope 210 includes a hole 1502 and cap 201 includes hole 1504 which may be cut or formed as discussed above. The size and shape of these holes generally corresponds to a width of threaded body portion 1224 of the fill port body 1202 but are no larger than a diameter of the sealing o-ring 1232 and the lower flange portion 1222.

In order to attach the filling apparatus 1200 to the balloon envelope and cap, the hole 1502 in the balloon envelope 210 may be aligned with the hole 1504 in the cap 201 as shown in FIG. 15. The threaded body portion 1224 of the fill port body 1202 is placed through the holes 1502 and 1504 from what will become the interior of the balloon envelope 210. The lower flange portion 1222 does not pass through the holes 1502 and 1504 but makes contact with what will become an interior surface of the balloon envelope 210.

The pinch-off tube assembly 1100 may then be placed within passageway 1228 of the fill port body 1202 until lip 1114 contacts a top portion of the threaded body portion 1224. O-rings 1126 and 1128 are compressed within the grooves 1116 and 1118 and against an internal surface of the threaded body portion 1224 as shown in FIGS. 13 and 14. In this regard, as noted above, O-rings 1126 and 1128 may each form an air tight seal with the threaded body portion 1224.

Before or after the plug 1112 of pinch-off tube assembly 1100 is placed within passageway 1228, the fill port body retaining nut 1204 is then placed over the threaded body portion 1224. For example, the fill port body retaining nut 1204 may be screwed onto the threaded body portion via the complementary threading of internal threading 1240. As the fill port body retaining nut 1204 is tightened against the cap 201, sealing O-ring 1232 creates an air tight seal against what will become the interior surface of the balloon envelope 210.

In order to further secure the pinch-off tube assembly 1100 to the fill port body 1202, the fill tube cap 1206 is placed over the tubular portion 1102 and onto the threaded body portion 1224 of the fill port body 1202. The fill tube cap 1206 may be secured to the threaded body portion 1224 via internal threading 1260 and the threading of the threaded body portion. The fill tube cap 1206 may also secure the pinch-off tube assembly 1100 in place by contact between surface 1262 and the lip 1114 of the flange portion 1110.

Once the fill port body is secured to the balloon envelope material, the balloon envelope and balloon may be completed as described above in order to produce a completed balloon. In this regard, the pinch-off tube assembly 1100 may be secured to the fill port body before or after the balloon envelope and balloon are completed. In addition, in some examples, before, during, and after assembly of the filling apparatus to the balloon envelope and cap, high vacuum grease may be applied to all or some of the components of the filling apparatus 1200.

Once the filling apparatus and the completed balloon are assembled, the completed balloon may then be inflated using the filling apparatus 1200. As with the filling apparatus 400 and the example of FIG. 8, the completed balloon envelope and filling apparatus 1200 may then be attached to a lift gas fill source via the fitting (not shown) in order to fill the envelope with lift gas. Thus, lift gas may progress from the lift gas fill source, through the passageways of the tubular portion and the fill port body, and into the balloon envelope in order to inflate the chamber of the balloon envelope. Again, the O-rings provide air tight seals in order to prevent gas from escaping during inflation.

Figure 19:
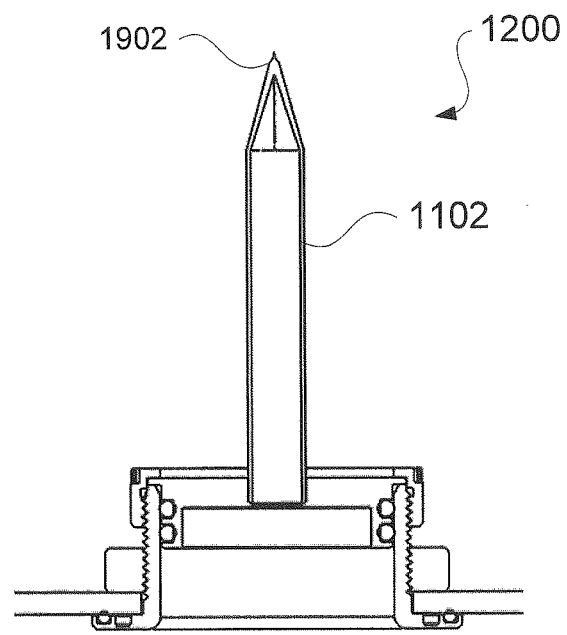
FIG. 19 is a cross sectional view of the filling apparatus of FIG. 12 after being sealed.

Once a desired level of inflation has been reached, the filling apparatus 1200 may be pinched off, for example, using a cold welding process as described above. FIG. 19 is an example 1900 of filling apparatus 1200 after it has been welded shut. In this example, the open end 1104 (not shown) has been removed from the filling apparatus 1200 and an air tight seal 1902 is formed. As with the example of filling apparatus 400, the section of the tubular portion 1102 associated with the open end 1104 may be still attached to lift a gas fill source via the fitting. This section may be removed from lift gas fill source and discarded. Air tight seal 1902 as well as the seals of each of the O-rings 1126, 1128, and 1226 may prevent lift gasses from escaping from the completed balloon envelope during use of the balloon even in high-altitude environments as described above.

Figure 20:
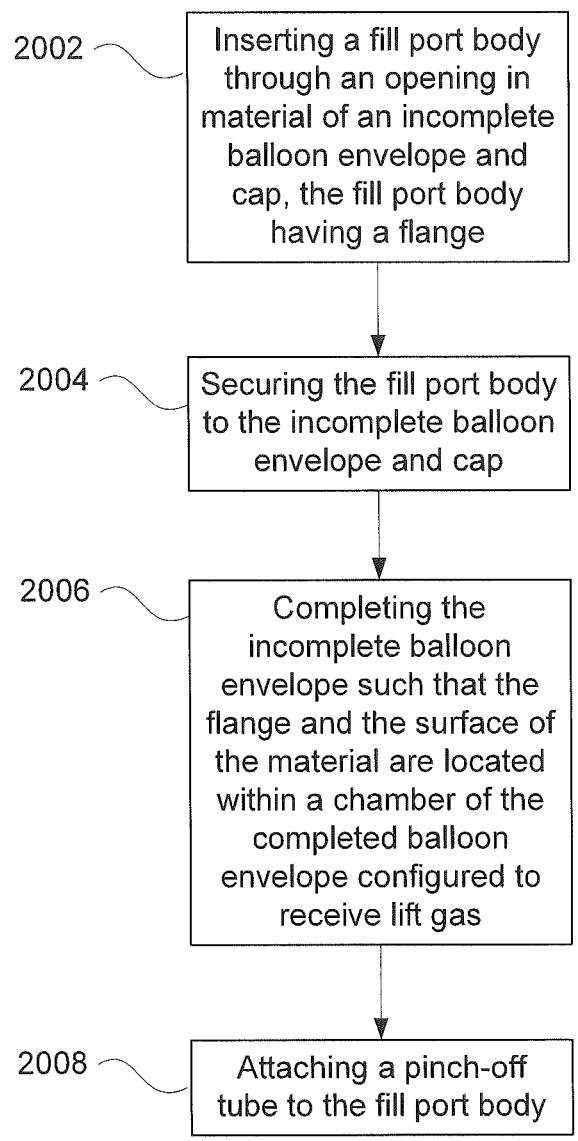
FIG. 20 is a flow diagram in accordance with aspects of the disclosure.

Flow diagram 2000 of FIG. 20 is an example flow diagram of some of the aspects described above which may be used to manufacture a high-altitude balloon having a balloon envelope using a filling apparatus such as filling apparatus 1200. In this example, a fill port body is inserted through an opening in material of an incomplete balloon envelope and cap at block 2002. The fill port body has a flange. The fill port body is secured to the incomplete balloon envelope and the cap at block 2004. The incomplete balloon envelope is then completed such that the flange and the surface of the material are located within a chamber of the completed balloon envelope configured to receive lift gas at block 2006. A pinch-off tube assembly is attached to the fill port body at block 2008. Again, as noted above, the pinch-off tube assembly may be attached before or after the incomplete balloon envelope is completed.

Figure 21:
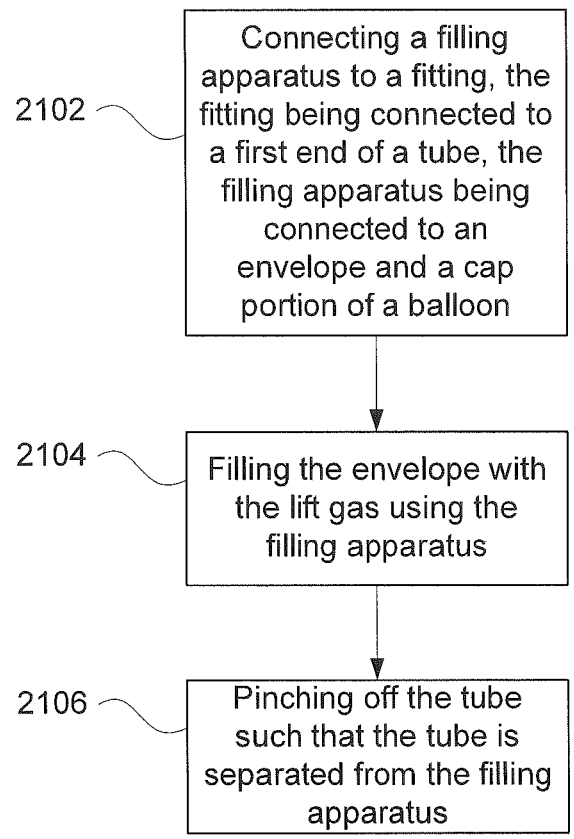
FIG. 21 is another flow diagram in accordance with aspects of the disclosure.

Flow diagram 2100 of FIG. 21 is an example flow diagram of some of the aspects described above which may be used to fill a high-altitude balloon with lift gas. In this example, a filling apparatus is connected to a fitting at block 2102. The fitting is connected to a first end of a tube. The filling apparatus is connected to a balloon envelope and a cap portion of a balloon. The envelope is filled with the lift gas using the filling apparatus at block 2104. As noted above, in some examples, the lift gas may include hydrogen. The tube is pinched off such that the tube is separated from the filling apparatus at block 2106. The pinching off may include a cold welding process which reduces a likelihood of combustion of the lift gas. The welding may also prevent the lift gas from escaping from the envelope after the filling.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
   a filling apparatus for filling a balloon, the apparatus comprising:
   a tube having a first end and a second end; and
   a plug member connected to the second end such that the tube extends through at least a portion of the plug member to provide a conduit for gas between the first end and a second end and through the plug, the plug member having a flange portion arranged around the tube, and the plug member further having at least one groove arranged around an external surface of the plug member; and
   an o-ring arranged in the at least one groove.

2. The system of claim 1, wherein the flange portion corresponds to a disc with a lip that extends outwardly relative to a surface of the plug member in which the at least one groove is arranged.

3. The system of claim 1, wherein the tube is comprised of a first metal and the plug member is comprised of a second metal.

4. The system of claim 3, wherein the tube is comprised of copper.

5. The system of claim 3, wherein the plug member is comprised of stainless steel.

6. The system of claim 3, wherein the first metal is different from the second metal.

7. The system of claim 1, wherein the materials of the o-ring and plug member are selected to compensate for changing dimensions of the materials at predetermined temperatures.

8. The system of claim 1, wherein the tube is configured for cold welding to seal lift gas in the balloon.

9. The system of claim 1, wherein the plug member includes a second groove arranged between the first groove and the flange.

10. The system of claim 8, further comprising a second O-ring arranged in the second groove.

11. The system of claim 10, wherein high vacuum grease is arranged on the O-ring and the second O-ring.

12. The system of claim 10, wherein each of the O-ring and the second O-ring includes flourosilicone in order to reduce shrinkage of the each of the O-rings at a predetermined altitude.

13. The system of claim 10, wherein the at least one groove and the second groove extends around a complete circumference of the plug member.

14. The system of claim 10, wherein the at least one groove and the second groove are arranged parallel to one another on the plug member.

15. The system of claim 10, wherein the at least one groove and the second groove are arranged below a first side of the flange and the tube extends above a second side of the flange, the first side is opposite of the second side.

16. The system of claim 1, further comprising a fitting attached to the first end, the fitting is configured for attachment to a filling apparatus.

17. The system of claim 16, wherein the fitting is braze welded to the first end.

18. The system of claim 1, wherein the filling apparatus is configured for attachment to a top plate of a balloon envelope such that the first end extends away from the balloon envelope.

19. The system of claim 1, wherein each of the O-ring includes flourosilicone in order to reduce shrinkage of the each of the O-rings at a predetermined altitude.

20. The system of claim 10, wherein high vacuum grease is arranged on the O-ring.

* * * * *